United States Patent
Hayakawa

(10) Patent No.: US 12,510,494 B2
(45) Date of Patent: Dec. 30, 2025

(54) X-RAY IMAGING APPARATUS AND SUBJECT HOLDING MECHANISM

(71) Applicant: Shimadzu Corporation, Kyoto (JP)

(72) Inventor: Masashi Hayakawa, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 298 days.

(21) Appl. No.: 18/497,127

(22) Filed: Oct. 30, 2023

(65) Prior Publication Data
US 2024/0230559 A1 Jul. 11, 2024

(30) Foreign Application Priority Data
Jan. 10, 2023 (JP) .................................. 2023-001773

(51) Int. Cl.
*G01N 23/046* (2018.01)

(52) U.S. Cl.
CPC ..... *G01N 23/046* (2013.01); *G01N 2223/309* (2013.01); *G01N 2223/321* (2013.01); *G01N 2223/33* (2013.01); *G01N 2223/3307* (2013.01); *G01N 2223/419* (2013.01)

(58) Field of Classification Search
CPC ........... G01N 23/046; G01N 2223/309; G01N 2223/321; G01N 2223/33; G01N 2223/3307
See application file for complete search history.

(56) References Cited

U.S. PATENT DOCUMENTS

| | | | | |
|---|---|---|---|---|
| 9,510,795 | B2 * | 12/2016 | Takemoto | A61B 6/51 |
| 2021/0215590 | A1 * | 7/2021 | Li | G01N 33/24 |
| 2022/0404295 | A1 * | 12/2022 | Toyoda | G01N 23/046 |

FOREIGN PATENT DOCUMENTS

| | | | | |
|---|---|---|---|---|
| JP | 5999516 B2 | | 9/2016 | |
| KR | 20240029083 A | * | 3/2024 | G01N 23/04 |
| WO | WO-2024083342 A1 | * | 4/2024 | G01N 23/02 |

* cited by examiner

*Primary Examiner* — Casey Bryant
(74) *Attorney, Agent, or Firm* — Maier & Maier, PLLC

(57) ABSTRACT

An X-ray imaging apparatus according to this invention includes an X-ray irradiator, an X-ray detector and a subject holding mechanism; the subject holding mechanism includes a subject grasping mechanism including a pair of graspers and a holder, and a rotation mechanism configured to rotate the subject grasping mechanism; the holder includes a first fixed position adjuster and a second fixed position adjuster; and one of the pair of graspers is fixed to the holder at a position that is adjusted by the first fixed position adjuster, and the another of the pair of graspers is fixed to the holder at a position that is adjusted by the second fixed position adjuster.

15 Claims, 11 Drawing Sheets

(COMP. EX.)

(COMP. EX.)

X-RAY IMAGING APPARATUS AND SUBJECT HOLDING MECHANISM

CROSS-REFERENCE TO RELATED APPLICATIONS

The related application number JP2023-001773, X-ray imaging apparatus and subject holding mechanism, Jan. 10, 2023, HAYAKAWA Masashi upon which this patent application is based are hereby incorporated by reference.

BACKGROUND

The present invention relates to an X-ray imaging apparatus and a subject holding mechanism, and in particular to an X-ray imaging apparatus and a subject holding mechanism in which a subject is irradiated with X-rays in an upward/downward direction.

X-ray imaging apparatuses for irradiating a subject with X-rays in an upward/downward direction are known in the art. Such an X-ray imaging apparatus is disclosed in Japanese Patent Publication No. JP 5999516, for example.

The above Japanese Patent Publication No. JP 5999516 discloses a radiologic imaging apparatus including a stage on which an object is placed, and radiation irradiator and detector that face each other so that the stage interposed between the radiation irradiator and the radiation detector. The radiation irradiator and the radiation detector disclosed in the above Japanese Patent Publication No. JP 5999516 are aligned in the upward/downward direction.

Although not stated in the above Japanese Patent Publication No. JP 5999516, a rotation mechanism is known which is configured to rotate a subject about a rotation axis intersecting an X-ray irradiation axis with the radiation irradiator (X-ray irradiator) and the radiation detector (X-ray detector) being aligned in the upward/downward direction to be able to capture a three-dimensional image of the subject. Such a rotation mechanism rotates the subject with the subject being held by a subject holding mechanism including a grasping mechanism configured to grasp the subject. This subject holding mechanism may not stably hold a subject if the subject is heavy. For this reason, it is desired to provide an X-ray imaging apparatus capable of stably holding a subject when capturing an image of the subject while rotating the subject even if the subject is heavy.

SUMMARY

The present invention is intended to solve the above problem, and one object of the present invention is to provide an X-ray imaging apparatus including a subject holding mechanism capable of stably holding a subject when capturing an image of the subject while rotating the subject even if the subject is heavy, and a subject holding mechanism capable of stably holding a subject when an image of the subject is captured while the subject is rotated even if the subject is heavy.

In order to attain the aforementioned object, an X-ray imaging apparatus according to a first aspect of the present invention is an X-ray imaging apparatus for irradiating a subject with X-rays to capture an image of the subject, the X-ray imaging apparatus including an X-ray irradiator configured to irradiate the subject with the X-rays; an X-ray detector arranged to face the X-ray irradiator in an upward/downward direction and configured to detect the X-rays with which the subject is irradiated by the X-ray irradiator; and a subject holding mechanism arranged between the X-ray irradiator and the X-ray detector and configured to rotatably hold the subject, wherein the subject holding mechanism includes a subject grasping mechanism including a pair of graspers configured to grasp the subject, a pair of first fasteners configured to fasten the pair of graspers, and a holder configured to hold the pair of graspers, and a rotation mechanism configured to rotate the subject grasping mechanism, which includes the pair of graspers and the holder, about a rotation axis extending in a direction intersecting an X-ray irradiation axis, the holder includes a first fixed position adjuster configured to adjust a fixed position of one of the pair of graspers in a radial direction with respect to the rotation axis, and a second fixed position adjuster configured to adjust a fixed position of another of the pair of graspers in the radial direction with respect to the rotation axis, and the one of the pair of graspers is fixed to the holder at a position that is adjusted by the first fixed position adjuster of the holder, and the another of the pair of graspers is fixed to the holder at a position that is adjusted by the second fixed position adjuster of the holder.

A subject holding mechanism according to a second aspect of this invention is a subject holding mechanism for an X-ray imaging apparatus for irradiating a subject with X-rays in an upward/downward direction to capture an image of the subject with the subject holding mechanism being detachably attached to the X-ray imaging apparatus to rotatably hold the subject, the subject holding mechanism including a subject grasping mechanism including a pair of graspers configured to grasp the subject, a pair of fasteners configured to fasten the pair of graspers, and a holder configured to hold the pair of graspers, and a rotation mechanism configured to rotate the subject grasping mechanism, which includes the pair of graspers and the holder, about a rotation axis extending in a direction intersecting an X-ray irradiation axis, wherein the holder includes a first fixed position adjuster configured to adjust a fixed position of one of the pair of graspers in a radial direction with respect to the rotation axis, and a second fixed position adjuster configured to adjust a fixed position of another of the pair of graspers in the radial direction with respect to the rotation axis, and the one of the pair of graspers is fixed to the holder at a position that is adjusted by the first fixed position adjuster of the holder, and the another of the pair of graspers is fixed to the holder at a position that is adjusted by the second fixed position adjuster of the holder.

In the X-rays imaging apparatus according to the first aspect and the subject holding mechanism according to the second aspect, as discussed above, a subject grasping mechanism including a pair of graspers configured to grasp the subject, a pair of first fasteners configured to fasten the pair of graspers, and a holder configured to hold the pair of graspers is provided. In addition, a rotation mechanism configured to rotate the subject grasping mechanism, which includes the pair of graspers and the holder, is provided. Also, the holder includes a first fixed position adjuster configured to adjust a fixed position of one of the pair of graspers in a radial direction with respect to the rotation axis, and a second fixed position adjuster configured to adjust a fixed position of another of the pair of graspers in the radial direction with respect to the rotation axis. Also, the one of the pair of graspers is fixed to the holder at a position that is adjusted by the first fixed position adjuster of the holder, and the another of the pair of graspers is fixed to the holder at a position that is adjusted by the second fixed position adjuster of the holder. The pair of graspers are held by the holder with a subject being grasped by the graspers, and rotated together with the holder by the rotation mechanism.

If the subject is heavy, the subject cannot be stably held when rotated by the rotation mechanism. To address this, the one of the pair of graspers is fixed to the holder at a position that is adjusted by the first fixed position adjuster, and the another of the pair of graspers is fixed to the holder at a position that is adjusted by the second fixed position adjuster. In other words, each of the pair of graspers is fixed to the holder with the subject being grasped by the graspers. Accordingly, for example, as compared with a case in which only one of the pair of graspers is fixed to the holder, the subject can be stably held even if the subject is heavy. Consequently, it is possible to stably hold a subject when capturing an image of the subject while rotating the subject even if the subject is heavy.

DETAILED DESCRIPTION

Embodiments embodying the present invention will be described with reference to the drawings.

An X-ray imaging apparatus 100 according to one embodiment of the present invention is now entirely described with reference to FIGS. 1 and 2.

Figure 1:
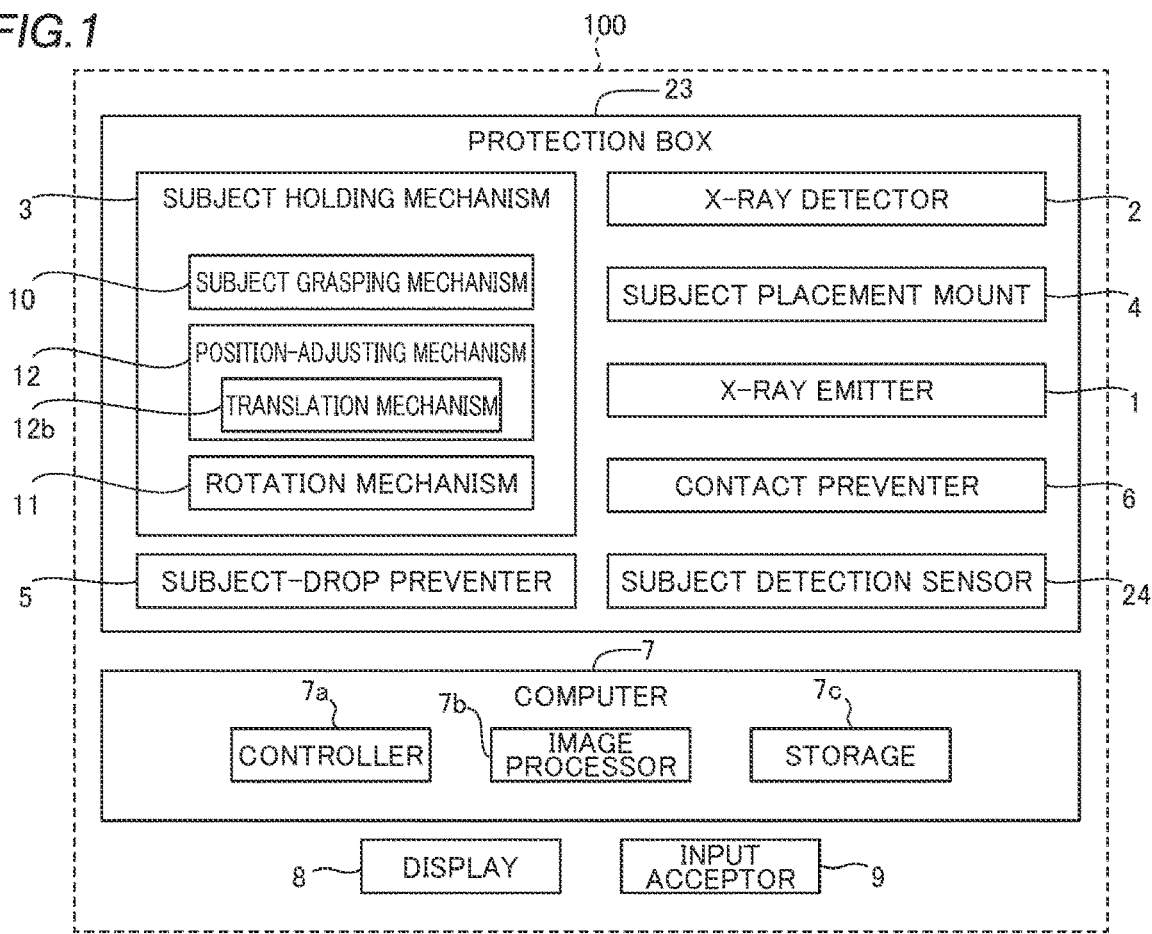
FIG. 1 is a schematic diagram showing the entire configuration of an X-ray imaging apparatus according to one embodiment.

As shown in FIG. 1, the X-ray imaging apparatus 100 includes an X-ray irradiator 1, an X-ray detector 2 and a subject holding mechanism 3. In addition, the X-ray imaging apparatus 100 includes a subject placement mount 4, a subject-drop preventer 5, a contact preventer 6, a computer 7, a display 8 and an input acceptor 9. The subject holding mechanism 3 includes a subject grasping mechanism 10, a rotation mechanism 11 and a position-adjusting mechanism 12. Detailed configurations of the subject grasping mechanism 10, the rotation mechanism 11 and the position-adjusting mechanism 12 will be described later.

Figure 2:
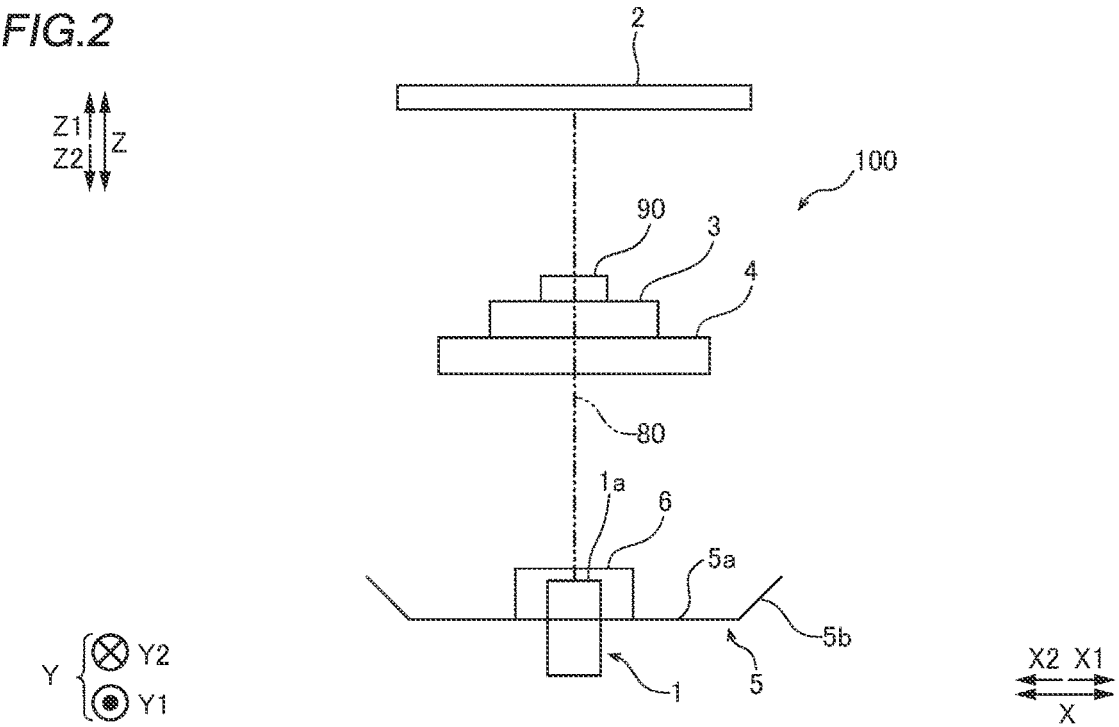
FIG. 2 is a schematic view showing a configuration of the X-ray imaging apparatus and an arrangement of a subject holding mechanism according to the one embodiment.

FIG. 2 is a side view showing the X-ray imaging apparatus 100. As shown in FIG. 2, the X-ray imaging apparatus 100 is an X-ray imaging apparatus for irradiating a subject 90 with X-rays to capture an image of the subject. Specifically, the X-ray imaging apparatus is an X-ray imaging apparatus 100 for irradiating the subject 90 with X-rays in an upward/downward direction. For example, the subject 90 is an electronic part, a circuit board, an electric motor, etc. In this specification, the upward/downward direction is defined as a Z direction. An upward direction is defined as a Z1 direction, and a downward direction is defined as a Z2 direction in the upward and downward directions. Two directions orthogonal to each other in a plane orthogonal to the Z-direction are defined as X and Y directions. One direction is defined as an X1 direction, and another direction is defined as an X2 direction in the X direction. One direction is defined as a Y1 direction, and another direction is defined as a Y2 direction in the Y direction.

The X-ray irradiator 1 is configured to irradiate the subject with X-rays in a direction of an irradiation axis 80. The X-ray irradiator 1 is configured to generate X-rays when a high voltage is applied. In this embodiment, the X-ray irradiator 1 is arranged on a lower side with respect to the X-ray detector 2. Accordingly, in this embodiment, the X-ray irradiator 1 irradiates the subject with X-rays in the upward direction (Z1 direction).

The X-ray detector 2 is configured to detect X-rays with which the subject is irradiated by the X-ray irradiator 1. As shown in FIG. 2, X-ray detector 2 faces the X-ray irradiator 1 in the upward/downward direction (Z direction). The X-ray detector 2 is configured to convert the detected X-rays into electrical signals. The X-ray detector 2 is a flat panel detector (FPD), for example. The X-ray detector 2 includes a plurality of converters (not shown), and a plurality of pixel electrodes (not shown) arranged on the plurality of converters. The detection signals (image signals) of the X-ray detector 2 are transmitted to an image processor 7b, which will be described later.

The subject holding mechanism 3 is configured to rotatably hold the subject 90. The subject holding mechanism 3 is arranged between the X-ray irradiator 1 and the X-ray detector 2. Specifically, the subject holding mechanism 3 is arranged at a position on the X-ray irradiation axis 80 between the X-ray irradiator 1 and the X-ray detector 2. The subject holding mechanism 3 is arranged on the subject placement mount 4 with the subject 90 being held by the subject holding mechanism. In other words, the subject 90 is held by the subject holding mechanism 3 and placed between the X-ray irradiator 1 and the X-ray detector 2.

The subject 90 is placed on the subject placement mount 4. In this embodiment, the subject holding mechanism 3 holds the subject 90 and is then placed on the subject placement mount 4 so that the subject 90 is placed on the subject placement mount. In a case in which the subject holding mechanism 3 is not mounted to the subject placement mount 4, a plate-like member having high X-ray transmittance is placed on the subject placement mount 4, and the subject 90 is placed on the plate-like member. A detailed configuration of the subject placement mount 4 will be described later.

The subject-drop preventer 5 serves to prevent the subject 90 from dropping. In this embodiment, the subject-drop preventer 5 is arranged between the X-ray irradiator 1 and the subject holding mechanism 3. That is, the subject-drop preventer 5 serves to prevent that the subject 90 drops downward (toward Z1 direction side) from the X-ray irradiator 1. In this embodiment, the subject-drop preventer 5 includes a main part 5a and edge parts 5b. The subject-drop preventer 5 has a frame shape having an opening (not shown) in the main part 5a in a plane view. In this embodiment, the X-ray irradiator 1 is arranged inside the main part 5a. The edge parts 5b protrude toward the X-ray detector 2 (in the Z1 direction). Accordingly, for example, when the subject 90 falls onto the subject-drop preventer 5, it is possible to prevent that the subject 90 drops downward from the subject-drop preventer 5.

In this embodiment, the contact preventer 6 is arranged between the X-ray irradiator 1 and the subject holding mechanism 3 to cover the X-ray irradiator 1. Specifically, the contact preventer 6 is configured to entirely cover an irradiation surface 1a of the X-ray irradiator 1. That is, the contact preventer 6 is configured to prevent the subject 90 held by the subject holding mechanism 3 from contacting the X-ray irradiator 1 in imaging. Also, the contact preventer 6 is configured to prevent that the subject 90 falling from the subject holding mechanism 3 contacts the X-ray irradiator 1. The contact preventer 6 has an opening (not shown) in a location facing the irradiation surface 1a of the X-ray irradiator 1. The contact preventer 6 may not have the opening. In this case, a part of the contact preventer 6 through which X-rays from the X-ray irradiator 1 can be formed of a material having high X-ray transmittance.

(Subject Placement Mount)

Figure 3:
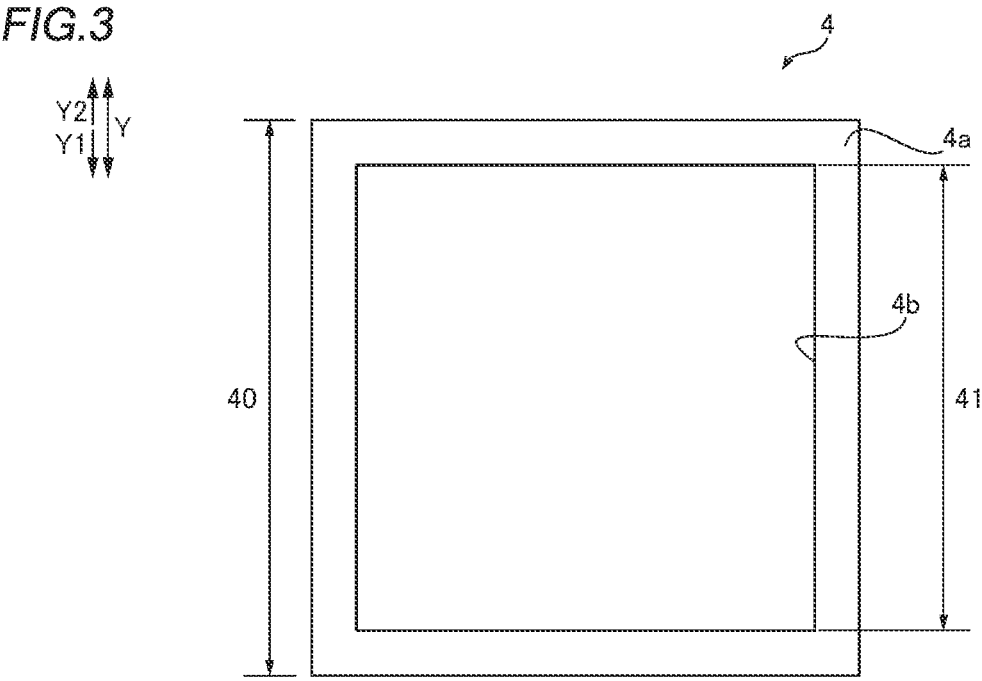
FIG. 3 is a schematic view showing a configuration of a subject placement mount of the X-ray imaging apparatus according to the one embodiment.

A configuration of the subject placement mount 4 is now described with reference to FIG. 3. FIG. 3 is a schematic view showing the subject placement mount 4 as viewed in the Z1 direction. As shown in FIG. 3, the subject placement mount 4 has a rectangular shape in a plan view. The subject placement mount 4 shown in FIG. 3 has a square shape having sides of a length 40. The subject placement mount 4 may have a rectangular shape other than such a square shape.

The subject placement mount 4 includes a main part 4a, and has a frame shape in the plan view. The subject placement mount 4 has a first opening 4b formed in the main part 4a. Specifically, the first opening 4b has a square shape having sides of a length 41. The first opening 4b may have a rectangular shape other than such a square shape.

In this embodiment, the subject placement mount 4 is configured to detachably hold the subject holding mechanism 3 (see FIG. 4) in the first opening 4b. Specifically, the subject placement mount 4 holds the subject holding mechanism 3 inside the main part 4a so that the subject holding mechanism 3 is positioned in the first opening 4b. In a case in which the subject holding mechanism 3 is not mounted to the subject placement mount 4, the first opening 4b is covered with the plate-like member having high X-ray transmittance by a user so that the subject 90 (see FIG. 2) is placed on the plate-like member. An example of a material of the plate-like member having high X-ray transmittance can be provided by FRP (Fiber Reinforced Plastics).

(Subject Grasping Mechanism, Rotation Mechanism and Position-Adjusting Mechanism)

Figure 4:
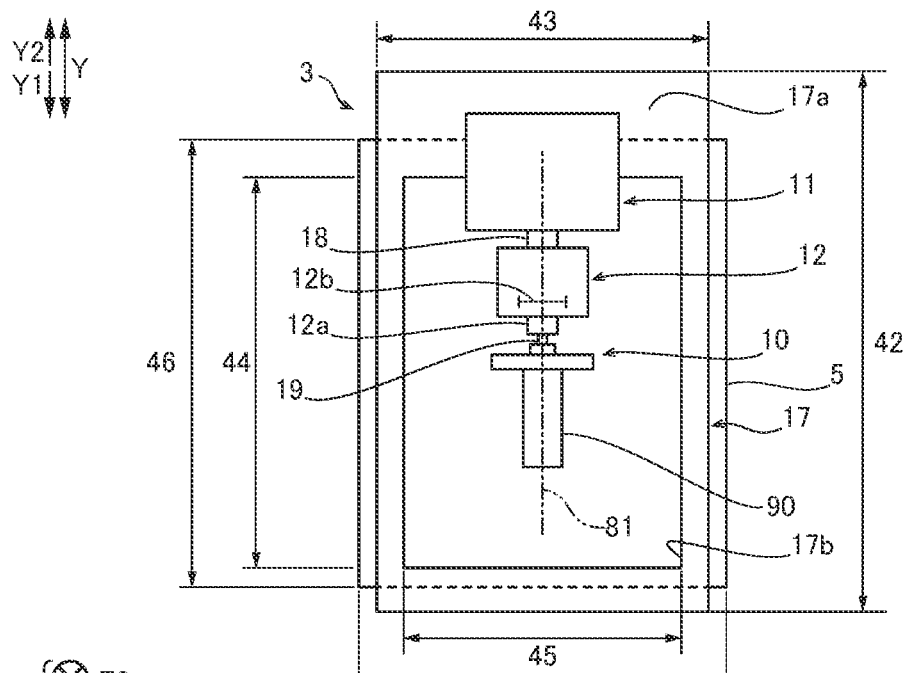
FIG. 4 is a schematic view showing a configuration of the subject holding mechanism of the X-ray imaging apparatus according to the one embodiment.

The configurations of the subject grasping mechanism 10, the rotation mechanism 11 and the position-adjusting mechanism 12, which are included in the subject holding mechanism 3, are now described with reference to FIG. 4. FIG. 4 is a schematic view showing the subject holding mechanism 3 as viewed in the Z1 direction.

As shown in FIG. 4, the subject holding mechanism 3 further includes a base 17 in addition to the subject grasping mechanism 10, the rotation mechanism 11 and the position-adjusting mechanism 12. As shown in FIG. 4, the base 17 is configured to hold the rotation mechanism 11 and the subject grasping mechanism 10. Specifically, the base 17 holds the rotation mechanism 11. Also, the rotation mechanism 11 holds the position-adjusting mechanism 12. Also, the position-adjusting mechanism 12 holds the subject grasping mechanism 10. That is, the base 17 is configured to hold the rotation mechanism 11, the position-adjusting mechanism 12 and the subject grasping mechanism 10.

As shown in FIG. 4, the base 17 includes a main part 17a. Also, the base 17 has a second opening 17b formed in the main part 17a. That is, the base 17 has a frame shape in a plan view. The base 17 shown in FIG. 4 has an exemplary frame shape having longer side of a length 42 and shorter sides of a length 43.

The second opening 17b has a rectangular shape in a plan view. The second opening 17b shown in FIG. 4 has a rectangular shape having longer side of a length 44 and shorter sides of a length 45. The main part 17a is configured to receive the rotation mechanism 11.

The rotation mechanism 11 is arranged on the main part 17a of the base 17. In this embodiment, the rotation mechanism 11 is configured to rotate a first connector 18. The first connector 18 is connected to the position-adjusting mechanism 12. The first connector 18 has a cylindrical shape. The rotation mechanism 11 is configured to rotate the position-adjusting mechanism 12 about a rotation axis 81 by rotating the first connector 18 about the rotation axis 81. In an exemplary arrangement shown in FIG. 4, the rotation mechanism 11 is arranged in the main part 17a of the base 17 on a Y2 direction side of the main part 17a with the rotation axis 81 facing in the Y1 direction.

The position-adjusting mechanism 12 is connected to the first connector 18, and is held to the rotation mechanism 11 rotatably together with the first connector 18 about the rotation axis 81. Also, the position-adjusting mechanism 12 is arranged between the subject grasping mechanism 10 and the rotation mechanism 11. In other words, the position-adjusting mechanism 12 is connected to both the subject grasping mechanism 10 and the rotation mechanism 11. Specifically, the position-adjusting mechanism 12 includes a subject grasping mechanism fixer 12a. The subject grasping mechanism fixer 12a is a part of the position-adjusting mechanism 12 to which the subject grasping mechanism 10 is fixed. In this embodiment, the subject grasping mechanism fixer 12a holds the subject grasping mechanism 10 through the second connector 19. Accordingly, the rotation mechanism 11 is configured to rotate the subject grasping mechanism 10 including the pair of graspers 13 and holders 15 (see FIG. 5) about the rotation axis 81 (Y direction), which intersects the X-ray irradiation axis 80 (see FIG. 2).

The second connector 19 has a cylindrical shape. The first connector 18 and the second connector 19 are configured to be rotated together by the rotation mechanism 11. In other words, the first connector 18 and the second connector 19 serve as rotation axes about which the rotating position-adjusting mechanism 12 and the subject grasping mechanism 10 rotates, respectively, when they rotate about the rotation axis 81.

The position-adjusting mechanism 12 is configured to adjust a position of the subject grasping mechanism 10. Specifically, the position-adjusting mechanism 12 is configured to adjust the position of the subject grasping mechanism 10 in a plane intersecting the X-ray irradiation axis 80 (XY plane). In this embodiment, the position-adjusting mechanism 12 is configured to adjust the position of the subject grasping mechanism 10 by adjusting a position of the subject grasping mechanism fixer 12a. For example, the position-adjusting mechanism 12 includes a translation mechanism 12b (see FIG. 1). The translation mechanism 12b includes an X-directional translation mechanism and a Y-directional translation mechanism, and is configured to move the subject grasping mechanism 10 in the X-direction and the Y-direction. Each of the X-directional translation mechanism and the Y-directional translation mechanism includes a stepping motor and a sensor. The X-directional translation mechanism and the Y-directional translation mechanism are configured to move the subject grasping mechanism 10 in the X-direction and the Y-direction, respectively under control of a controller 7a (see FIG. 1), which will be described later. In this embodiment, the position-adjusting mechanism 12 is configured to be used for fine adjustment in which a rotation center of the subject 90 agree with the rotation axis 81.

The subject grasping mechanism 10 is configured to grasp the subject 90. In this embodiment, the subject grasping mechanism 10 is configured be rotated about the rotation axis 81 by the rotation mechanism 11 with the subject 90 being grasped by the subject grasping mechanism. Specifically, the subject grasping mechanism 10 is connected to the position-adjusting mechanism 12, which is connected to the rotation mechanism 11. Accordingly, the subject grasping mechanism 10 is rotated together with the position-adjusting mechanism 12 about the rotation axis 81 by the rotation mechanism 11. The subject grasping mechanism 10 including the pair of graspers 13 (see FIG. 5) is detachably attached to the rotation mechanism 11. A detailed configuration of the subject grasping mechanism 10 will be described later.

As shown in FIG. 4, the base 17 is configured to hold the rotation mechanism 11, the subject grasping mechanism 10 and the position-adjusting mechanism 12 so as to position the subject grasping mechanism 10 in the second opening 17b. Accordingly, the subject 90 can be rotated in a rotating direction about the rotation axis 81 by the rotation mechanism 11.

As shown in FIG. 4, in this embodiment, the length 42 of each longer side of the base 17 is smaller than the length 40 (see FIG. 3) of one side of the subject placement mount 4 (see FIG. 3), and is longer than the length 41 (see FIG. 3) of the one side of the first opening 4b (see FIG. 3). Accordingly, the base 17 is detachably attached into the first opening 4b (see FIG. 3). In other words, the subject holding mechanism 3 is detachably attached to the subject placement mount 4 (see FIG. 3).

As shown in FIG. 4, the subject-drop preventer 5 has an area is larger than an area of the second opening 17b in a plane view. Specifically, the length 46 of the longer side (a side extending in the Y direction) of the subject-drop preventer 5 is longer than the length 44 of the longer side of the second opening 17b. Also, the length 47 of the shorter side (a side extending in the X direction) of the subject-drop preventer 5 is longer than the length 45 of the shorter side of the second opening 17b. Accordingly, the area of the subject-drop preventer 5 is larger than the area of the second opening 17b. The subject-drop preventer 5 is configured to be dimensioned so that the second opening 17b is arranged inside the edge parts 5b of the subject-drop preventer 5.

With reference to FIG. 1 again, the apparatus is described. As shown in FIG. 1, the computer 7 includes the controller 7a, the image processor 7b, a memory, such as a read only memory (ROM), a random access memory (RAM), etc., and a storage 7c.

The controller 7a is configured to control components of the X-ray imaging apparatus 100. The controller 7a is configured to control a function of stopping operation of an operation mechanism of the rotation mechanism 11 and the position-adjusting mechanism 12 if receiving a signal from a subject detection sensor 24, which will be described later. Accordingly, the subject 90 can be prevented from contacting the X-ray irradiator 1. For example, the controller 7a includes a CPU (central processing unit), circuitry, etc.

The image processor 7b is configured to generate an X-ray image based on X-rays with which the subject is irradiated by the X-ray irradiator 1, and detected by the X-ray detector 2. The image processor 7b can generate (reconstruct) a three-dimensional X-ray image based on a plurality of X-ray images, which are captured while the subject 90 is rotated about the rotation axis 81 (see FIG. 3) by the rotation mechanism 11. The image processor 7b is constructed of a CPU, a GPU (graphics processing unit), a field-programmable gate array (FPGA) or circuitry configured for image processing, etc.

The storage 7c is configured to store various programs to be executed by the controller 7a. Also, the storage 7c is configured to store X-ray images generated by the image processor 7b. The storage 7c includes a storage device such as an HDD (Hard Disk Drive) or a nonvolatile memory e.g., a SSD (Solid State Drive), for example.

The display 8 is configured to display an X-ray image generated by the image processor 7b. For example, the display 8 includes display unit such as an LCD monitor or an organic Electro Luminescence monitor.

The input acceptor 9 is configured to accept operating inputs from a user. For example, the input acceptor 9 can accept an input of selecting operation from imaging conditions by the user. The input acceptor 9 includes an input device such as a keyboard, computer mouse, etc. for example. For example, the imaging conditions include a value of a tube voltage applied to the X-ray irradiator 1, image-capture angles when images of the subject are captured while the subject is rotated by the rotation mechanism 11, etc.

The X-ray imaging apparatus 100 includes a protection box 23. The protection box 23 accommodates the X-ray irradiator 1, the X-ray detector 2, the subject holding mechanism 3, the subject placement mount 4, the subject-drop preventer 5 and the contact preventer 6. The protection box 23 is configured to prevent that X-rays with which the subject is irradiated by the X-ray irradiator 1 leak from the protection box 23 to the outside. For example, the protection box 23 is a housing including a frame, and walls arranged on the frame. Plate-like members of a heavy metal are attached onto inner surfaces of the walls of the protection box 23. For example, the plate-like member of a heavy metal is a lead plate.

As shown in FIG. 1, the X-ray imaging apparatus 100 includes the subject detection sensor 24. The subject detection sensor 24 is configured to provide a detection signal to the controller 7a when the subject 90 is arranged in proximity to the X-ray irradiator 1. For example, the subject detection sensor 24 includes an optical sensor.

The X-ray imaging apparatus 100 can capture an image of the subject 90 (see FIG. 2) in accordance with the imaging conditions provided from the user and accepted by the input acceptor 9. In this embodiment, the X-ray imaging apparatus 100 is configured to capture a CT (Computed Tomography) image by capturing images of the subject 90 while rotating the subject by using the subject holding mechanism 3 about the rotation axis 81 (see FIG. 4).

(Subject Grasping Mechanism)

Figure 5:
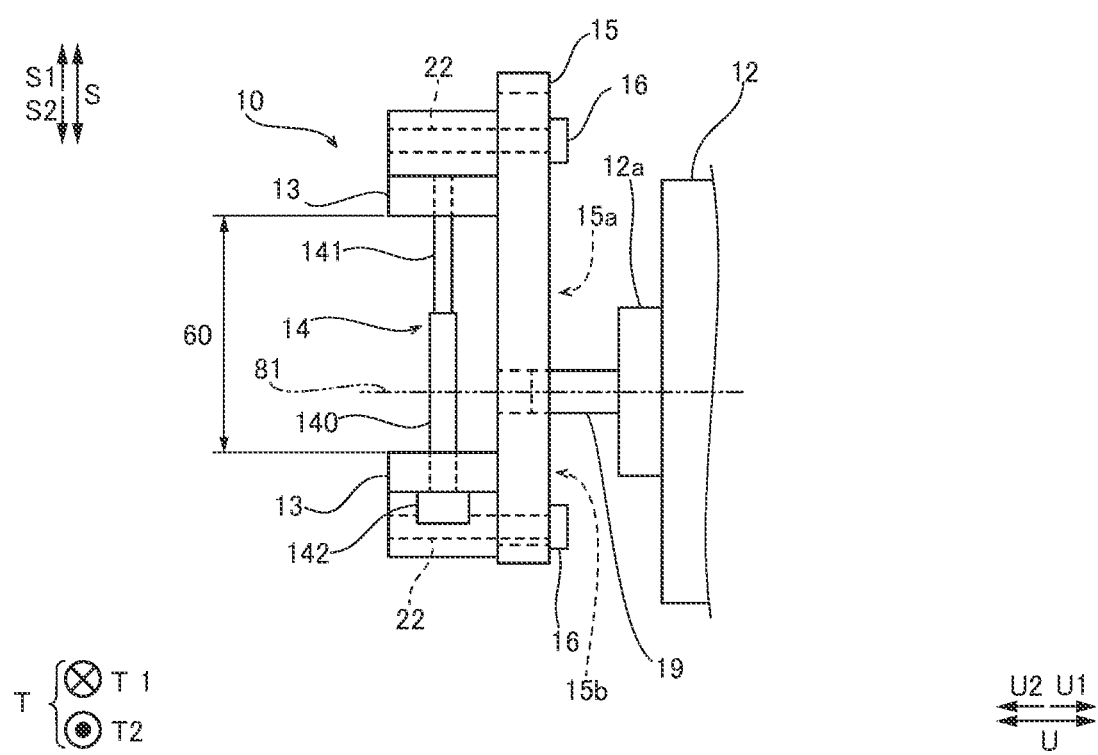
FIG. 5 is a schematic view showing an arrangement of a subject grasping mechanism being held by a position-adjusting mechanism according to the one embodiment.

A configuration of the subject grasping mechanism 10 is now described with reference to FIG. 5. As shown in FIG. 5, in this embodiment, the subject grasping mechanism 10 is configured to be able to hold the subject 90 (see FIG. 11) even if the subject has a large diameter 90a (see FIG. 11). Specifically, the subject grasping mechanism 10 includes a pair of graspers 13 configured to grasp the subject 90, a pair of first fasteners 14 configured to fasten the pair of graspers 13, and holders 15 configured to hold the pair of graspers 13. In this specification, a direction in which the first fasteners 14 extend is defined as an S direction in the subject grasping mechanism 10. One direction is defined as an S1 direction, and another direction is defined as an S2 direction in the S direction. Two directions orthogonal to each other in a plane orthogonal to the S-direction are defined as T and U directions. One direction is defined as a T1 direction, and another direction is defined as a T2 direction in the T direction. One direction is defined as a U1 direction, and another direction is defined as a U2 direction in the U direction.

The pair of first fasteners 14 are configured to be able to adjust a distance 60 between the pair of graspers 13. Each of the pair of first fasteners 14 includes a first part 140, a second part 141 and a header part 142. The first part 140 is a shaft part that connects the header part 142 to the second part 141. The second part 141 has thread grooves. The first fastener 14 is configured to engage the fixed part 21 (see FIG. 6), which will be described later, when the header part 142 is rotated to fix the pair of graspers 13. An insertion amount of the second part 141, which engages the fixed part 21, of can be changed by rotating the header part 142 the first fastener 14. Accordingly, the pair of first fasteners 14 are configured to be able to adjust the distance 60 between the pair of graspers 13.

The pair of graspers 13 are configured to hold the subject 90 (see FIG. 11) by adjusting the distance 60 between a pair of graspers 13 by means of the pair of first fasteners 14. The pair of graspers 13 are fixed to the holder 15 with the subject 90 being grasped by the graspers.

As shown in FIG. 5, the holder 15 includes a first fixed position adjuster 15a configured to adjust a fixed position of one of the pair of graspers 13 in a radial direction with respect to the rotation axis 81, and a second fixed position adjuster 15b configured to adjust a fixed position of another of the pair of graspers 13 in the radial direction with respect to the rotation axis. The first fixed position adjuster 15a and the second fixed position adjuster 15b shown in FIG. 5 are configured to be able to adjust fixed positions of the pair of graspers 13 in the S direction.

The one of the pair of graspers 13 is fixed to the holder 15 at a position that is adjusted by the first fixed position adjuster 15a of the holder 15. The another of the pair of graspers 13 is fixed to the holder 15 at a position that is adjusted by the second fixed position adjuster 15b of the holder 15. In other words, the pair of graspers 13 are fixed to the holder 15 after the distance 60 between the pair of graspers 13 is adjusted by the first fixed position adjuster 15a and the second fixed position adjuster 15b. A detained configuration that adjusts the fixed positions of the pair of graspers 13 will be described later.

As shown in FIG. 5, the subject holding mechanism 3 (see FIG. 4) includes a pair of second fasteners 16 configured to fasten the pair of graspers 13 to the holder 15. For example, the pair of second fasteners 16 is a screw member. Each of the pair of graspers 13 includes an engagement part 22 that penetrates the grasper in a direction extending parallel to the rotation axis 81 (U direction), and engages one of the pair of second fasteners 16. The engagement part 22 is a so-called internal-threaded part on which thread grooves are formed.

(Grasper and First Fastener)

Figure 6:
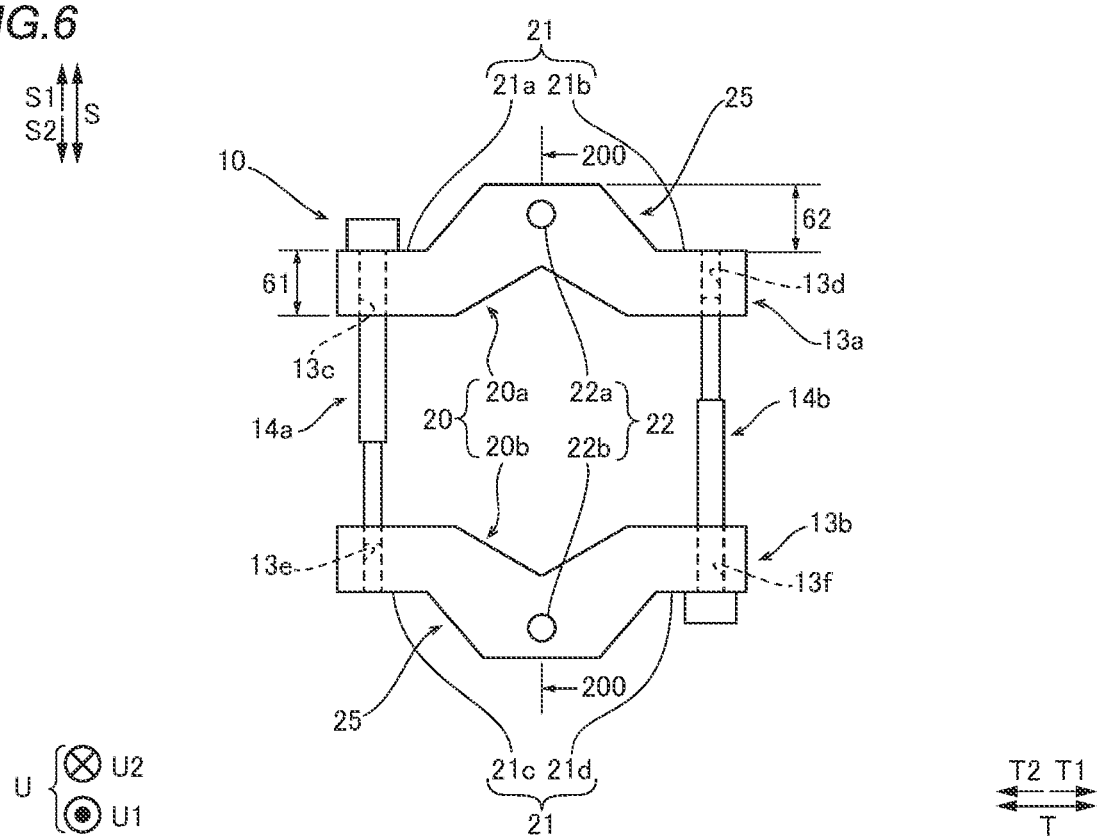
FIG. 6 is a diagram illustrating an arrangement of a pair of graspers and a pair of first fasteners according to the one embodiment.

As shown in FIG. 6, the subject grasping mechanism 10 includes a pair of graspers 13 (see FIG. 5) and a pair of first fasteners 14 (see FIG. 5). Specifically, the subject grasping mechanism 10 includes a grasper 13a and a grasper 13b as the pair of graspers 13. The subject grasping mechanism 10 includes a first fastener 14a and a first fastener 14b as the pair of first fasteners 14.

As shown in FIG. 6, each of the pair of graspers 13 (grasper 13a and grasper 13b) has a bar shape extending in the T direction as viewed in the U direction. The pair of graspers 13 are arranged to face each other, and configured to grasp the subject 90 (see FIG. 11). Each of the pair of graspers 13 includes a grasping part 20 configured to grasp the subject 90. Each of the pair of graspers 13 includes a pair of fixed parts 21 fixed by the pair of first fasteners 14. The fixed parts 21 are arranged on the both end parts of each of the pair of graspers 13 in a direction in which the grasper extends (T direction). The pair of graspers 13 are configured to grasp the subject 90 by fixing the fixed parts 21 by means of the pair of first fasteners 14.

As shown in FIG. 6, the pair of fixed parts 21 are arranged on both end parts of each of the pair of graspers 13 in the direction in which the pair of first fasteners 14 are aligned. Specifically, the grasper 13a includes a fixed part 21a arranged on a T2 direction side, and a fixed part 21b arranged on a T1 direction side. The grasper 13b includes a fixed part 21c arranged on the T2 direction side, and a fixed part 21d arranged on the T1 direction side.

The pair of fixed parts 21 are fixed by the pair of first fasteners 14. Specifically, in the pair of fixed parts 21, the fixed parts 21 facing to each other are fixed to each other by first fastener 14. One of the fixed parts 21 facing each other has a through-hole through which the first fastener 14 passes. Another of the fixed parts 21 facing each other has an engagement part that engages the second part 141 (see FIG. 5) of the first fastener 14. In the fixed parts 21 shown in FIG. 6, the fixed part 21a and the fixed part 21d are the through-holes. The fixed part 21b and the fixed part 21c are the engagement parts. Accordingly, in FIG. 6, the fixed part 21a of the grasper 13a is fixed to the fixed part 21c of the grasper 13b by the first fastener 14a. Also, the fixed part 21b of the grasper 13a is fixed to the fixed part 21d of the grasper 13b by the first fastener 14b.

Figure 11:
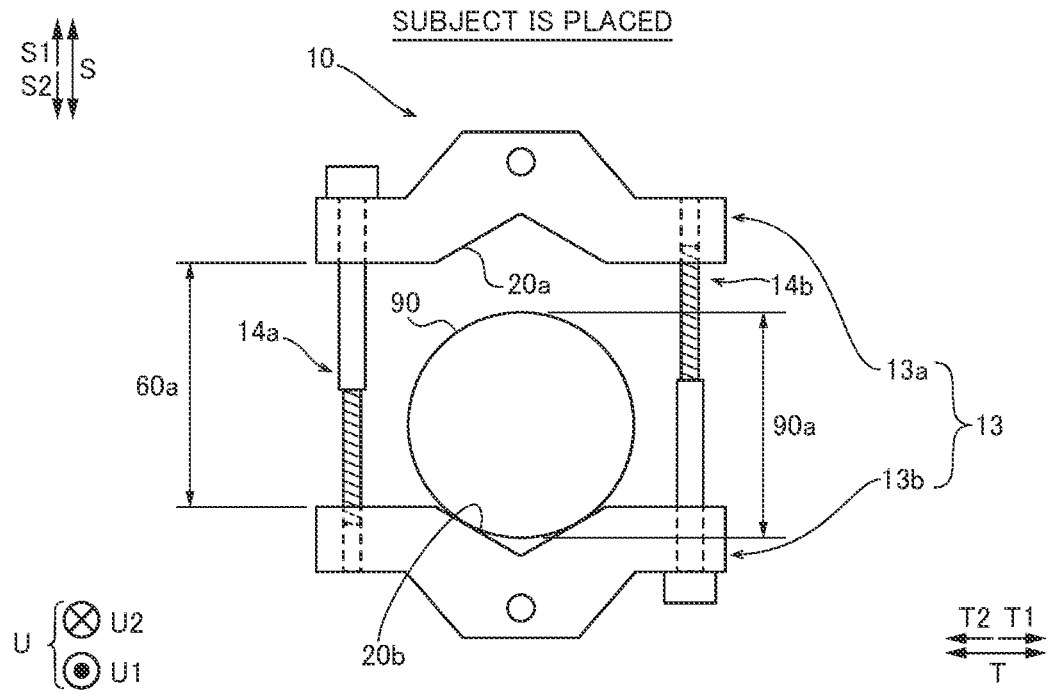
FIG. 11 is a schematic view illustrating the pair of graspers according to the one embodiment with a subject being placed between the graspers.

Grasping parts 20 grasps the subject 90 (see FIG. 11). The grasping parts 20 are configured to contact the subject 90 when the pair of graspers 13 grasp the subject 90. In other words, the grasping parts 20 are arranged on surfaces on sides of the pair of graspers 13 that face each other in the pair of graspers 13. A grasping part of the grasping parts 20 shown in FIG. 6 serves as a grasping part 20a arranged on the grasper 13a. A grasping part of the grasping parts 20 shown in FIG. 6 serves as a grasping part 20b arranged on the grasper 13b.

As shown in FIG. 6, the grasping parts 20 (grasping part 20a and grasping part 20b) of the pair of graspers 13 have a concave shape. The grasping part 20 of each of the pair of graspers 13 is arranged between the pair of first fasteners 14 in the direction (T direction) in which the pair of first fasteners 14 are aligned to grasp the subject 90. In other words, each grasping part 20 is arranged between the pair of first fasteners 14 in the T direction.

Also, each of the pair of graspers 13 includes a protruding part 25 arranged the between fixed parts 21 and protruding in a direction opposite to the grasping part 20. The protruding part 25 is arranged on a side of the grasper 13 opposite to the grasping part 20 in the S direction. The protruding part 25 protrudes by a thickness 62 from the fixed part 21 in the direction opposite to the grasping part 20. A thickness 61 of the fixed part 21 in the direction (S direction) where the first fastener 14 extends is smaller than the thickness 62 (protruding amount) of the protruding part 25 of the grasper 13 protruding from the fixed part 21.

Also, as shown in FIG. 6, each of the engagement parts 22 (engagement part 22a or engagement part 22b) is arranged between a pair of first fasteners 14 in the direction (T direction) in which the pair of first fasteners 14 are aligned with each other. The engagement part 22 is arranged in the protruding part 25 of the grasper 13. The engagement part 22 is a through-hole penetrating the grasper 13 (protruding part 25) in the U direction.

Figure 13:
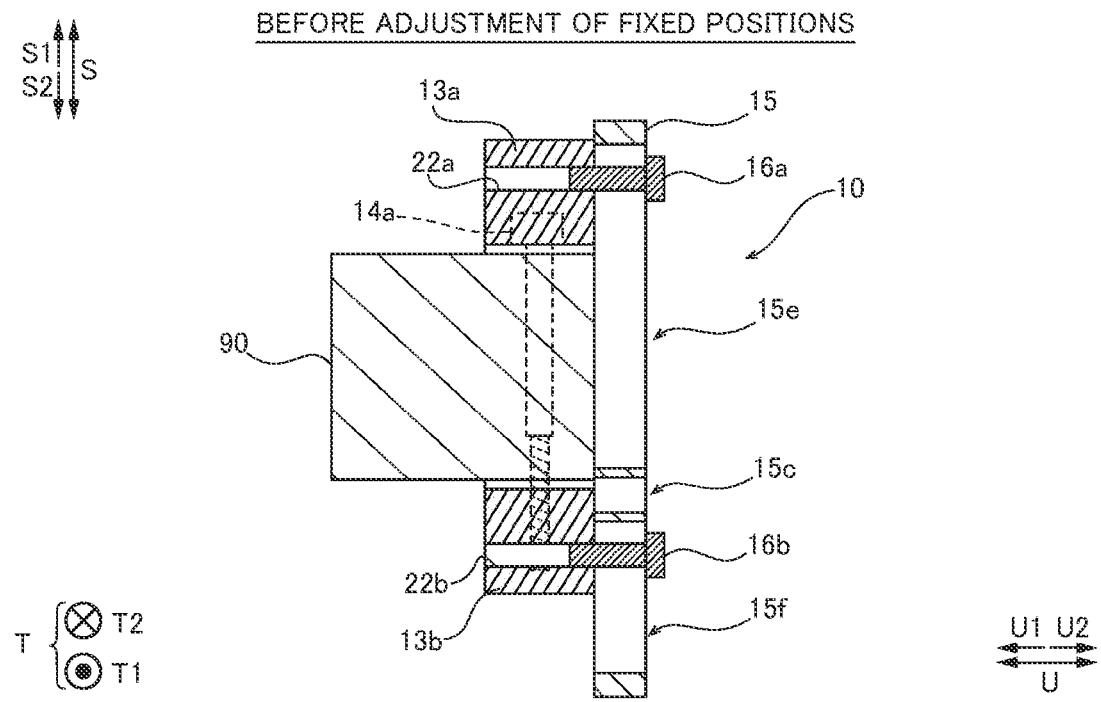
FIG. 13 is a schematic view illustrating the subject grasping mechanism according to the one embodiment before a fixed position of the pair of graspers is adjusted.

The grasper 13a includes the engagement part 22a, which engages a second fastener 16a (see FIG. 13). The grasper 13b includes the engagement part 22b, which engages a second fastener 16b (see FIG. 13). The engagement parts 22a and 22b are a so-called internal-threaded part on which thread grooves are formed, for example.

Figure 7:
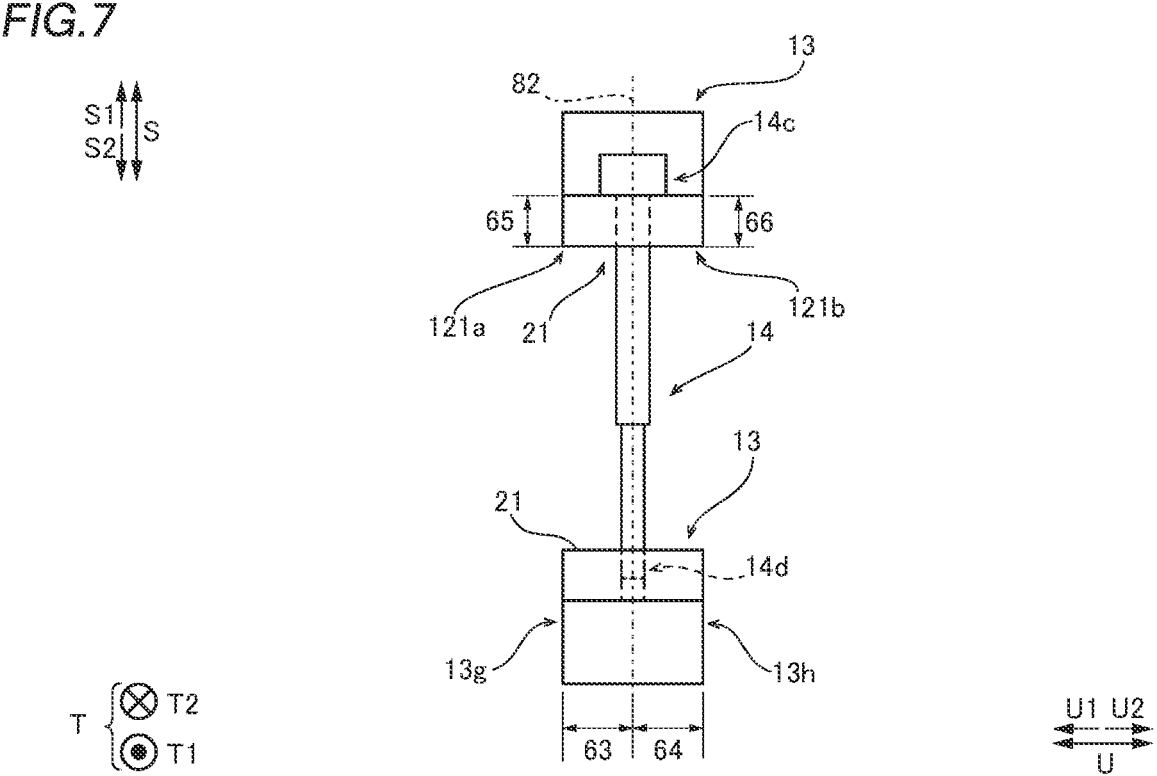
FIG. 7 is a schematic view showing the grasper according to the one embodiment as viewed in a direction in which the pair of first fasteners are aligned with each other.

FIG. 7 is a schematic view showing the pair of graspers 13, the pair of first fasteners 14 and the fixed parts 21 in a side view as viewed in the T1 direction. An arrangement as viewed in the T2 direction is similar to the arrangement as viewed in the T1 direction, and the pair of graspers 13, the pair of first fasteners 14 and the fixed parts 21 are described with reference to FIG. 7 as viewed in the T1 direction. As shown in FIG. 7, each of the pair of graspers 13 has a symmetric shape with respect to a line segment 82 that connects one end 14c to another end 14d of the first fastener 14 as viewed in the direction (T direction) in which the pair of first fasteners 14 are aligned with each other.

In other words, a length 63 from an edge on one side 13g of each of the pair of graspers 13 in the U direction to the line segment 82 is equal to a length 63 from another edge 13h in the U direction to the line segment 82.

As shown in FIG. 7, a thickness 65 in the radial direction with respect to the rotation axis 81 of one end side 121a of each of the pair of fixed parts 21 in a direction extending parallel to the rotation axis 81 (see FIG. 4) is equal to a thickness 66 in the radial direction with respect to the rotation axis 81 of another end side 121b of the fixed part. In this specification, one thickness equal to another thickness is used in a broad sense to include not only completely the same thickness but also thicknesses slightly deviated from completely the same thickness. That is, the thickness 65 and the thickness 66 can be considered equal to each other if a difference between them falls within tolerance.

(Holder)

Figure 8:
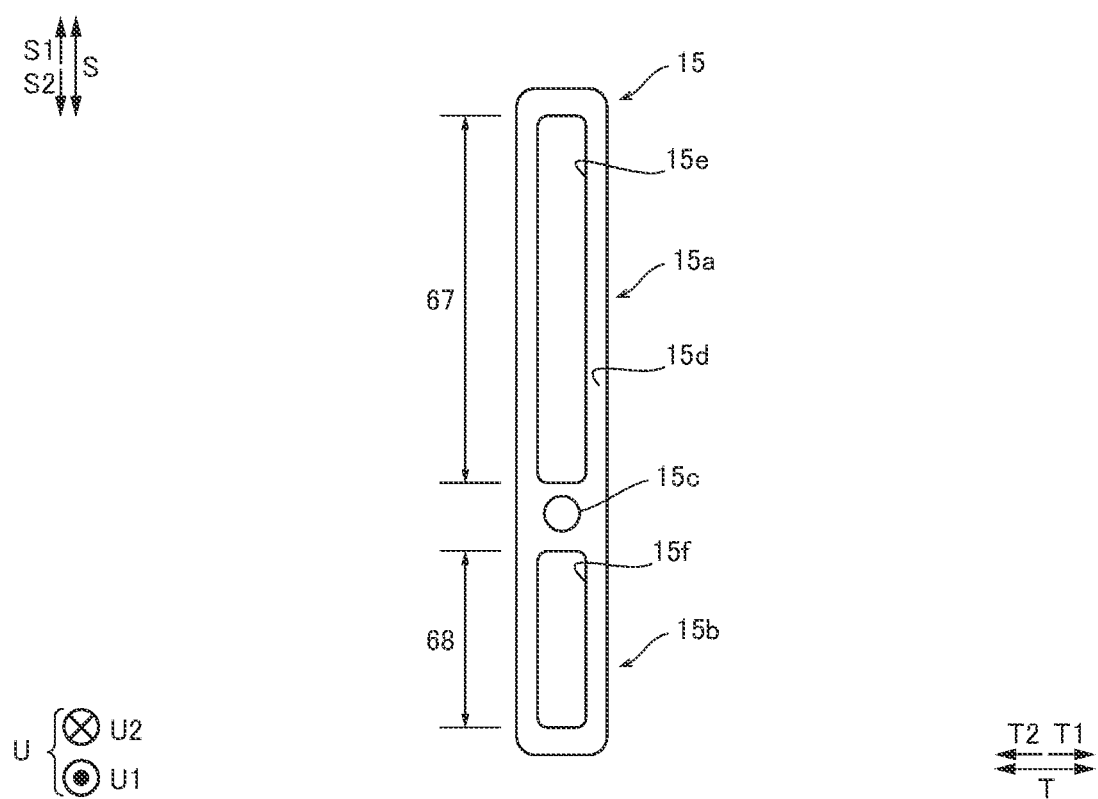
FIG. 8 is a schematic view showing a configuration of a holder according to the one embodiment.

A configuration of the holder 15 according to this embodiment is now described with reference to FIG. 8. As shown in FIG. 8, the holder 15 is a bar-shaped member having a rectangular shape as viewed in the U direction and extending in the S direction. The holder 15 includes a first fixed position adjuster 15a, a second fixed position adjuster 15b, a through-hole 15c, and a contact surface 15d configured to contact the second fastener 16 (see FIG. 5).

As shown in FIG. 8, the first fixed position adjuster 15a and the second fixed position adjuster 15b are arranged on sides opposite to each other with respect to the through hole 15c. In the holder 15 shown in FIG. 8, the first fixed position adjuster 15a and the second fixed position adjuster 15b extend in the S direction. In FIG. 8, the first fixed position adjuster 15a is arranged on the S1 direction side with respect to the through hole 15c. The second fixed position adjuster 15b is arranged on the S2 direction side with respect to the through hole 15c.

The second connector 19 (see FIG. 4) is inserted into and fixed in the through hole 15c. In other words, the rotation axis 81 (see FIG. 4) passes through a center of the through-hole 15c. Accordingly, the holder 15 is rotated about the through hole 15c by a rotation mechanism 11 (see FIG. 4).

In this embodiment, the first fixed position adjuster 15a is a first elongated hole 15e that is formed to receive one (second fastener 16a (see FIG. 13)) of the pair of second fasteners 16 (see FIG. 5) and extends in the radial direction with respect to the rotation axis 81. Also, the second fixed position adjuster 15b is a second elongated hole 15f that is formed to receive another (second fastener 16b (see FIG. 13)) of the pair of second fasteners 16 and extends in the radial direction with respect to the rotation axis 81. As a result, the pair of graspers 13 (see FIG. 6) is held by the holder 15 by bringing the pair of second fasteners 16 in contact with the contact surface 15d with the pair of second fasteners 16 being inserted into the first elongated hole 15e and the second elongated hole 15f.

A length 67 of the first elongated hole 15e extending in the radial direction with respect to the rotation axis 81 is different from a length 68 of the second elongated hole 15f extending in the radial direction with respect to the rotation axis 81. In an exemplary arrangement shown in FIG. 8, the length 67 of the first elongated hole 15e is longer than the length 68 of the second elongated hole 15f.

Because the first fixed position adjuster 15a and the second fixed position adjuster 15b are the first elongated hole 15e and the second elongated hole 15f, respectively, fixed positions of the pair of graspers 13 (see FIG. 5) in the radial direction with respect to the axis of rotation 81 can be adjusted. That is, the holder 15 is configured to be able to adjust a position of the subject 90 in the radial direction with respect to the rotation axis 81 of the rotation mechanism 11 (see FIG. 4). A detailed configuration of the holder 15 that adjusts a position of the subject 90 in the radial direction with respect to the rotation axis 81 of the rotation mechanism 11 will be described later.

(Grasping of Subject by Subject Grasping Mechanism)

A configuration that allows a user to grasp the subject 90 (see FIG. 11) by using the subject grasping mechanism 10 (see FIG. 9) is now described with reference to FIGS. 9 to 12.

Figure 9:
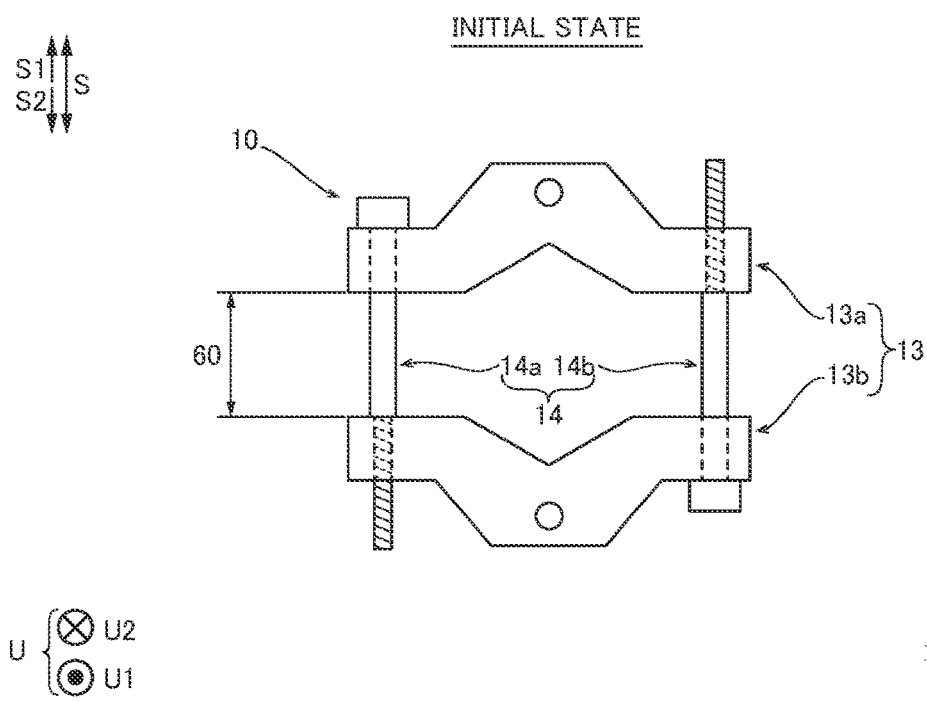
FIG. 9 is a schematic view illustrating an initial state before the subject grasping mechanism according to the one embodiment grasps a subject.

FIG. 9 is a schematic view illustrating an initial state before the subject grasping mechanism 10 grasps the subject 90 (see FIG. 11). The exemplary state shown in FIG. 9 corresponds to a shortest state in which the pair of first fasteners 14 (first fastener 14*a* and first fastener 14*b*) are the shortest. That is, the distance 60 between the pair of graspers 13 (grasper 13*a* and grasper 13*b*) shown in FIG. 9 is the smallest.

Figure 10:
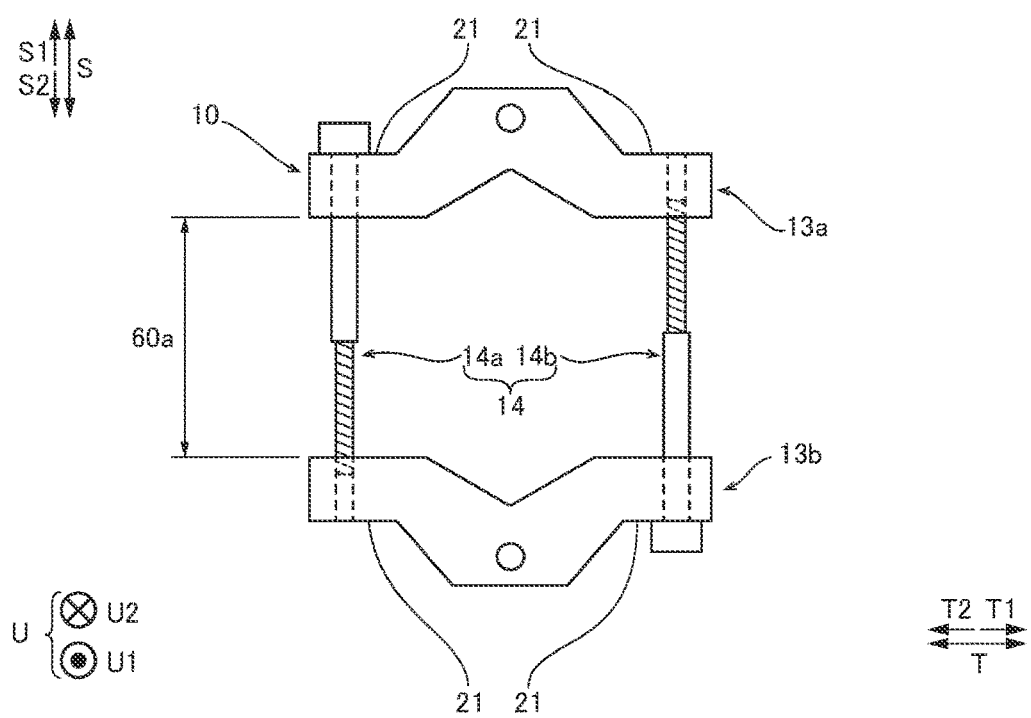
FIG. 10 is a schematic view illustrating the pair of graspers according to the one embodiment with one of graspers having been slid and moved.

An exemplary state shown in FIG. 10 corresponds to a state in which the grasper 13*a* is slid and moved in the S1 direction. When a user loosens the second fastener 16*a* (see FIG. 13), and then loosens the pair of first fasteners 14, the grasper 13*a* can slide along the first elongated hole 15*e* (see FIG. 8) in the S direction. In other words, the grasper 13*a* is configured to be able to slide and move along the first elongated hole 15*e* in the S1 direction by loosening the first fastener 14*a* and the first fastener 14*b* by the user. Loosening the first fastener 14*a* and the first fastener 14*b* refers to rotating the first fasteners 14 in a direction in which the first fastener 14*a* and the first fastener 14*b* are detached from the fixed part 21.

The exemplary state shown in FIG. 10 corresponds to a state in which the user loosens the pair of first fasteners 14 (first fastener 14*a* and first fastener 14*b*) and then slides and moves the grasper 13*a* along the first elongated hole 15*e* in the S1 direction. In a case in which the user slides and moves the grasper 13*a* along the first elongated hole 15*e* in the S1 direction, the grasper 13*a* is slid and moved to increase a distance 60*a* between the pair of graspers 13 to a distance greater than a diameter 90*a* of the subject 90 (see FIG. 11). In other words, after loosening the first fasteners 14*a* and the second fastener 14*b*, and increasing the distance 60*a* between the pair of graspers 13 to a distance greater than the diameter 90*a* of the subject 90, the subject grasping mechanism 10 is configured to allow the user to place the subject 90 between the pair of graspers 13 by sliding and moving the grasper 13*a* in the S1 direction.

Subsequently, the user places the subject 90 at a position between the pair of graspers 13, as shown in FIG. 11. Specifically, the user places the subject 90 on the grasping part 20*b* of the grasper 13*b*. At this time, because the distance 60*a* between the pair of graspers 13 is greater than the diameter 90*a* of the subject 90, the subject 90 is not in contact with the grasping part 20*a* of the grasper 13*a*.

Figure 12:
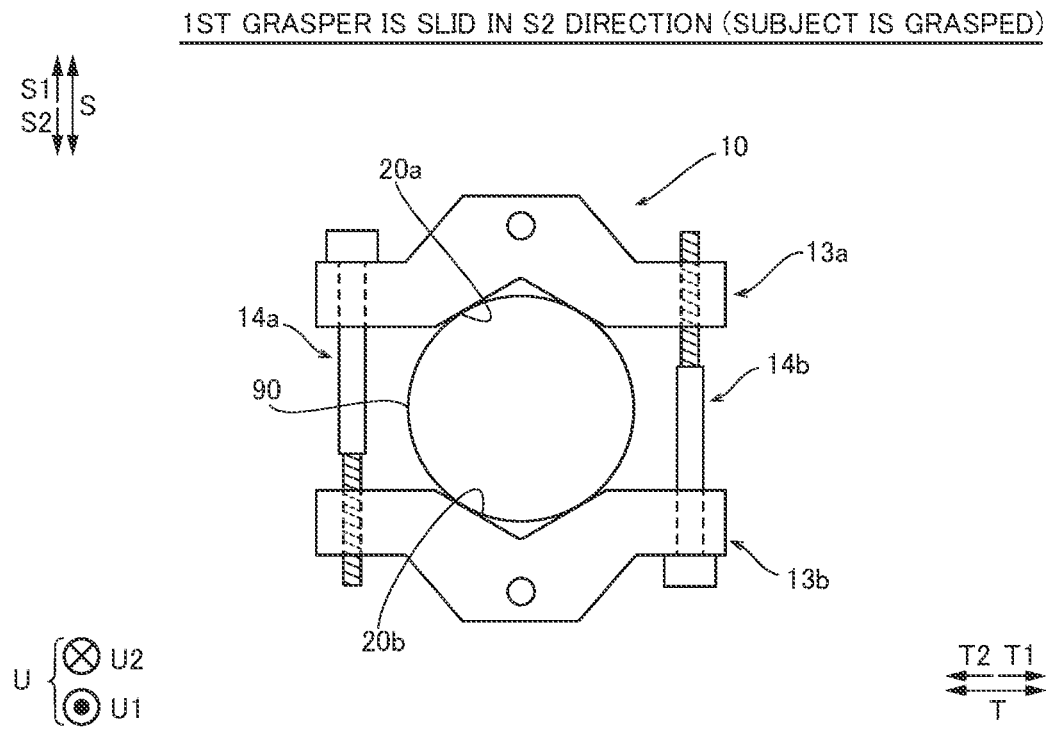
FIG. 12 is a schematic view illustrating the pair of graspers according to the one embodiment with the subject being grasped by the graspers.

Subsequently, as shown in FIG. 12, the user slides and moves the grasper 13*a* along the first elongated hole 15*e* in the S2 direction so that the grasping part 20*a* of the grasper 13*a* contacts the subject 90. Specifically, the user slides and moves the grasper 13*a* in the S2 direction by tightening the first fastener 14*a* and the first fastener 14*b*. As a result, the subject grasping mechanism 10 grasps the subject 90. Tightening the first fastener 14*a* and the first fastener 14*b* refers to rotating the first fasteners 14 in a direction in which an engagement amount of the first fastener 14*a* and the first fastener 14*b* with the fixed part 21 increases.

Processes shown in FIGS. 9 to 12 are conducted after the subject grasping mechanism 10 is detached from the X-ray imaging apparatus 100 (see FIG. 1) by the user. In other words, the user grasps the subject 90 by using the subject grasping mechanism 10 outside the X-ray imaging apparatus 100.

(Position Adjustment in Subject Grasping Mechanism in S Direction)

Figure 14:
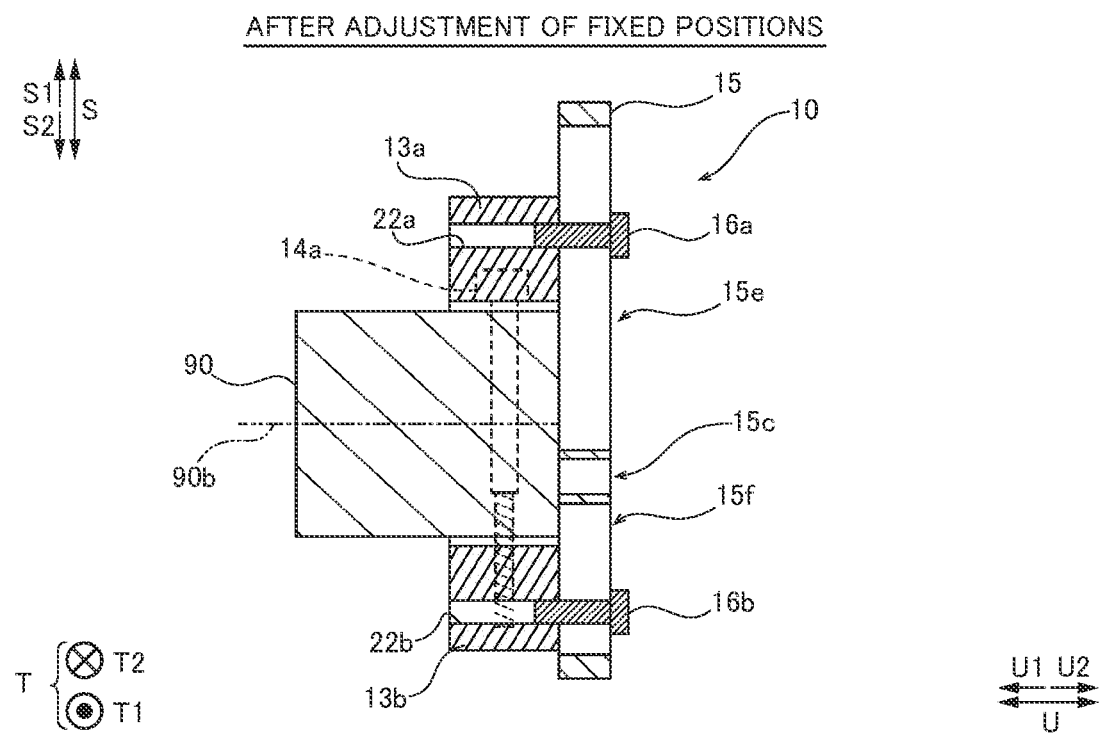
FIG. 14 is a schematic view illustrating the subject grasping mechanism according to the one embodiment after the fixed position of the pair of graspers is adjusted.

A configuration of the subject grasping mechanism 10 that adjusts a position of the grasped subject 90 in the S direction is now described with reference to FIGS. 13 and 14. FIGS. 13 and 14 are cross-sectional views taken along a line 200-200 in FIG. 6.

The subject grasping mechanism 10 shown in FIG. 13 is in a state before the position of the subject is adjusted in the S direction. The subject grasping mechanism 10 shown in FIG. 13 grasps the subject 90. In this state, the user loosens the second fastener 16*a* and the second fastener 16*b*. As a result, the subject grasping mechanism 10 can slide and move the grasper 13*a* and the grasper 13*b* together with the subject 90 in the S direction. In other words, the subject 90 is brought in a state the subject held by the pair of graspers 13 (see FIG. 5) can be slid and moved along the first elongated hole 15*e* and the second elongated hole 15*f* in the S direction in the subject grasping mechanism 10

An exemplary state shown in FIG. 14 corresponds to a state in which the grasper 13*a* and the grasper 13*b* are slid and moved together with each other in the S2 direction by the user. In this state, the second fasteners 16 are tightened by the user, and as a result adjustment of fixed positions of the pair of graspers 13 in the holder 15 is completed. The fixed positions of the pair of graspers 13 in the S direction shown in FIG. 14 is adjusted to position a center 90*b* of the subject 90 within a position adjustment range in the position-adjusting mechanism 12 (see FIG. 4).

Processes shown in FIGS. 13 and 14 are conducted performed by the user outside the X-ray imaging apparatus 100 (see FIG. 1). After that, the user attaches the subject grasping mechanism 10 to the X-ray imaging apparatus 100. Specifically, the subject grasping mechanism 10 is attached to the subject grasping mechanism fixer 12*a* (see FIG. 4) through the second connector 19 (see FIG. 4). The position-adjusting mechanism 12 is configured to adjust X and Y directional positions. Accordingly, when the subject grasping mechanism 10 is attached to the position-adjusting mechanism 12, the S direction extends along the X or Y direction. In this embodiment, the subject grasping mechanism 10 is attached to the position-adjusting mechanism 12 so that the S direction extends along the X direction.

Subsequently, the used operates the input acceptor 9 (see FIG. 1) to align the center 90*b* of the subject 90 with the rotation axis 81 (see FIG. 4) by means of the position-adjusting mechanism 12. After that, the rotation mechanism 11 (see FIG. 4) rotates the subject 90 about the rotation axis 81 so that images of the subject 90 are captured at a plurality of rotation angles. Accordingly, because the center of rotation (rotation axis 81) of the subject 90 can agree with the center 90*b* of the subject 90, a three-dimensional X-ray image can be generated (reconstructed) without positioning the subject 90 for the rotation angles.

(First and Second Graspers)

In this embodiment, a plurality of types of graspers including grasping parts 20 (see FIG. 6) having different shapes are provided to be used as the pair of graspers 13 (see FIG. 5). Specifically, as shown in FIGS. 15A and 15B, a pair of first graspers 130 (see FIG. 15A) and a pair of second graspers 131 (see FIG. 15B) are provided as pairs of graspers 13.

Figure 15A:
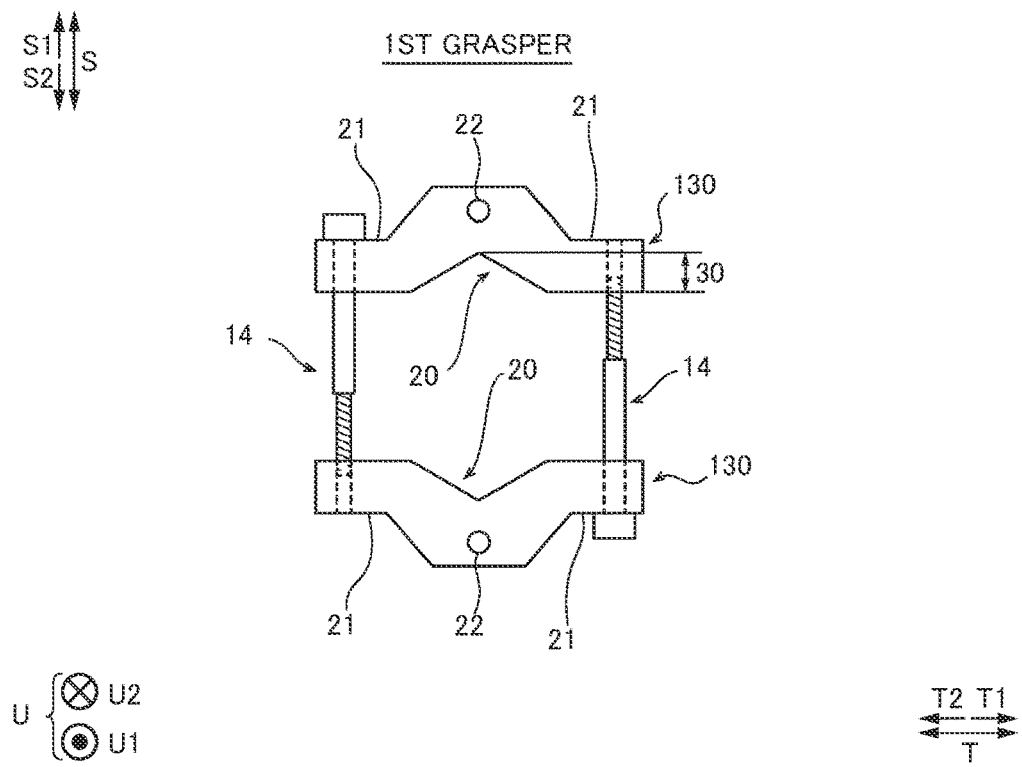
FIG. 15A is a schematic view showing a first grasper according to the one embodiment.

Because the pair of first graspers 130 shown in FIG. 15A has the same configuration as the pair of graspers 13 (see FIG. 5), the same configurations of first graspers 130 are denoted by the same reference numerals as the graspers 13, and their description is omitted.

Figure 15B:
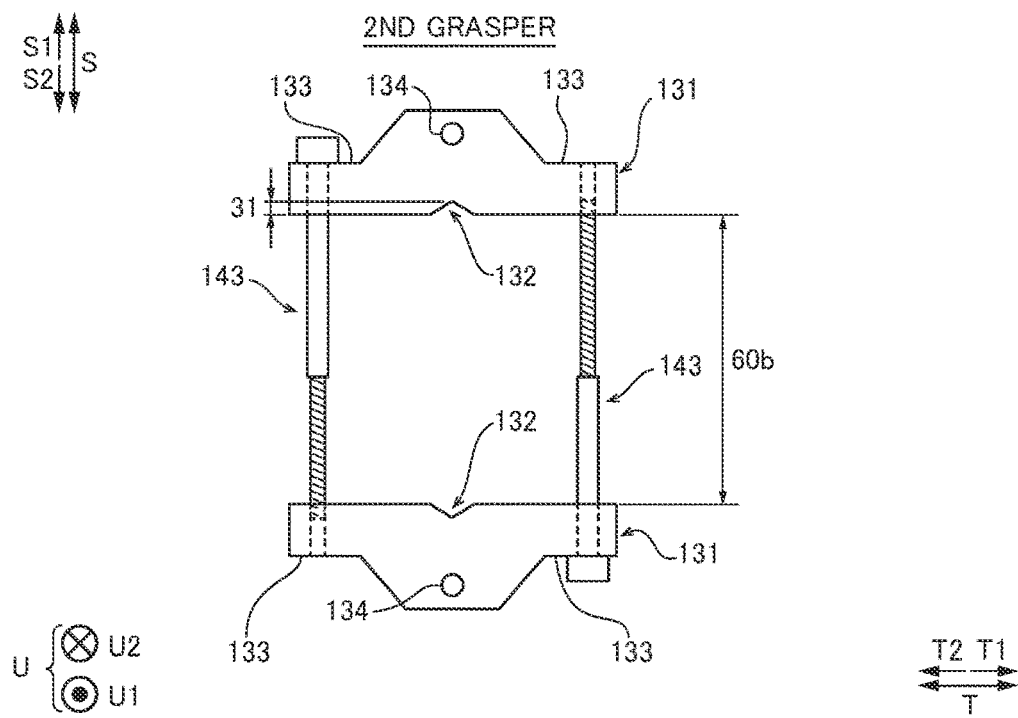
FIG. 15B is a schematic view showing a second grasper according to the one embodiment.

Each of a pair of second graspers 131 shown in FIG. 15B includes a grasping part 132 having a concave shape, and fixed parts 133 and an engagement part 134. The fixed parts 133 are arranged on the both end parts of each of the pair of second graspers 131. The engagement part 134 is arranged between fixed parts 133. The fixed parts 133 are fixed by third fasteners 143. The third fastener 143 has the same configuration as the first fastener 14, except that an adjustment amount of a distance 60b between the second graspers 131 is greater than an adjustment amount of the distance 60 (see FIG. 5) between the graspers 13 (see FIG. 5) by the first fastener 14 (see FIG. 5), and description of the third fastener 143 is omitted.

A protruding amount 31 of the grasping part 132 in the S direction is smaller than a protruding amount 30 of the grasping part 20 in the S direction. Accordingly, the second grasper 131 is suitable for grasping a subject 90 having a plate-like shape. The first grasper 130 (grasper 13) is suitable for grasping the subject 90 that has a cylindrical shape.

(First and Second Holders)

In this embodiment, at least two or more types of holders having different lengths of the first fixed position adjusters 15a (see FIG. 8) are provided as the holders 15 (see FIG. 8). Specifically, as shown in FIGS. 16A and 16B, a pair of first holders 150 (see FIG. 16A) and a pair of second holders 151 (see FIG. 16B) are provided as the holders 15.

Figure 16A:
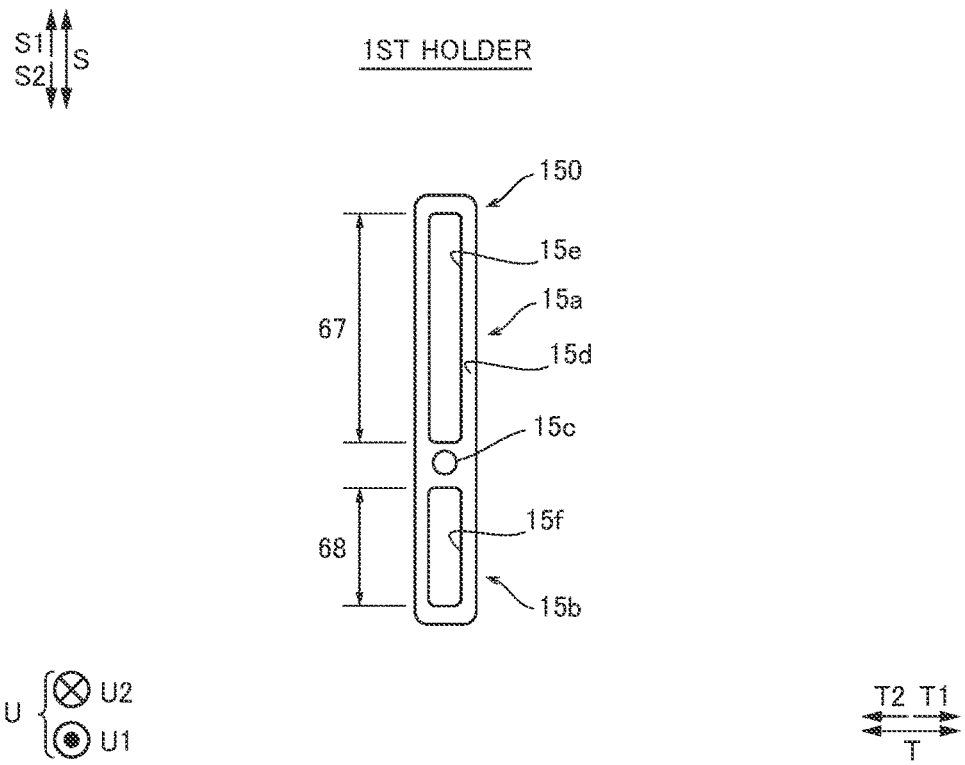
FIG. 16A is a schematic view showing a first holder according to the one embodiment.

Because the first holders 150 shown in FIG. 16A has the same configuration as the holders 15 (see FIG. 8), the same configurations of the holders 150 are denoted by the same reference numerals as the holders 15, and their description is omitted.

Figure 16B:
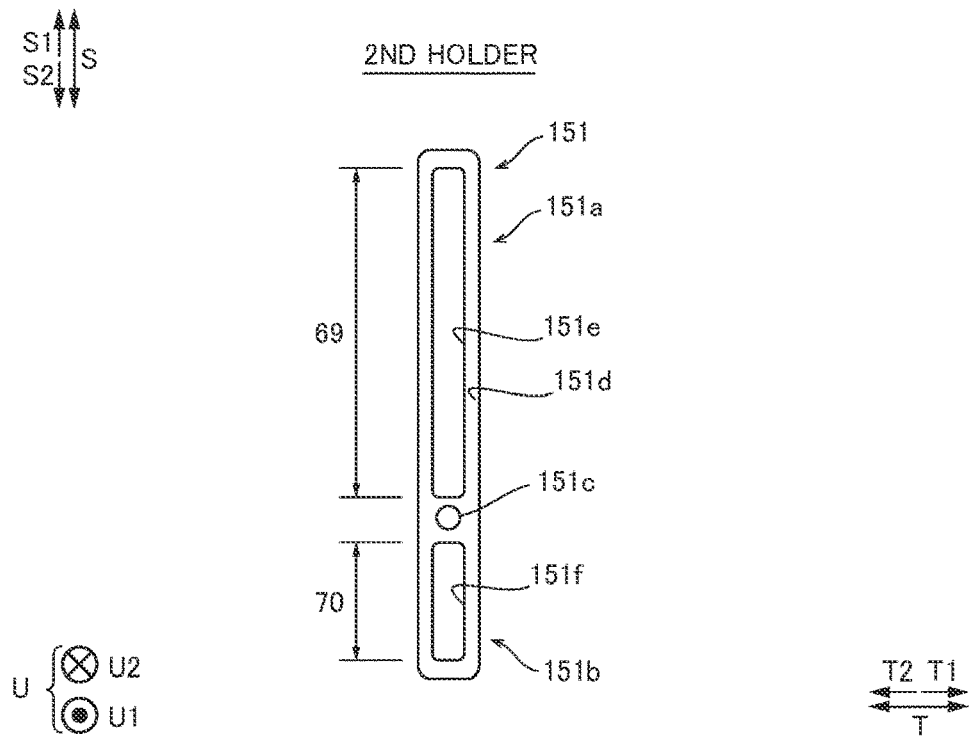
FIG. 16B is a schematic view showing a second holder according to the one embodiment.

The second holder 151 shown in FIG. 16B includes a third fixed position adjuster 151a, a fourth fixed position adjuster 151b, a through-hole 151c, and a contact surface 151d. The second connector 19 (see FIG. 4) is inserted into and fixed in the through hole 151c. The contact surface 151d is a surface to contact the second fastener 16 (see FIG. 6).

The third fixed position adjuster 151a is a third elongated hole 151e that is formed to receive the second fastener 16a (see FIG. 13) and extends in the radial direction with respect to the rotation axis 81 (see FIG. 4). The fourth fixed position adjuster 151b is a fourth elongated hole 151f that is formed to receive the second fastener 16b (see FIG. 13) and extends in the radial direction with respect to the rotation axis 81.

A length 69 of the third elongated hole 151e is longer than the length 67 of the first elongated hole 15e. That is, the third fixed position adjuster 151a can adjust the fixed position of the grasper 13a (see FIG. 6) in a wider range as compared with the first fixed position adjuster 15a.

A length 70 of the fourth elongated hole 151f is substantially equal to the length 68 of the second elongated hole 15f. That is, the fourth fixed position adjuster 151b can adjust the fixed position of the grasper 13b (see FIG. 6) in a range similar to the second fixed position adjuster 15b.

Advantages of the Embodiment

In this embodiment, the following advantages are obtained.

In this embodiment, as discussed above, the X-ray imaging apparatus 100 is an X-ray imaging apparatus for irradiating a subject 90 with X-rays to capture an image of the subject including an X-ray irradiator 1 configured to irradiate the subject with the X-rays; an X-ray detector 2 arranged to face the X-ray irradiator 1 in an upward/downward direction (Z direction) and configured to detect the X-rays with which the subject is irradiated by the X-ray irradiator 1; and a subject holding mechanism 3 arranged between the X-ray irradiator 1 and the X-ray detector 2 and configured to rotatably hold the subject 90, wherein the subject holding mechanism 3 includes a subject grasping mechanism 10 including a pair of graspers 13 configured to grasp the subject 90, a pair of first fasteners 14 configured to fasten the pair of graspers 13, and holders 15 configured to hold the pair of graspers 13, and a rotation mechanism 11 configured to rotate the subject grasping mechanism 10, which includes the pair of graspers 13 and each of the holders 15, about a rotation axis 81 extending in a direction intersecting an X-ray irradiation axis 80, the holder 15 includes a first fixed position adjuster 15a configured to adjust a fixed position of one (grasper 13a) of the pair of graspers 13 in a radial direction with respect to the rotation axis 81, and a second fixed position adjuster 15b configured to adjust a fixed position of another (grasper 13b) of the pair of graspers 13 in the radial direction with respect to the rotation axis, and the one of the pair of graspers 13 is fixed to the holder 15 at a position that is adjusted by the first fixed position adjuster 15a of the holder 15, and the another of the pair of graspers 13 is fixed to the holder 15 at a position that is adjusted by the second fixed position adjuster 15b of the holder 15.

The pair of graspers 13 are held by the holder 15 with a subject 90 being grasped by the graspers, and rotated together with the holder 15 by the rotation mechanism 11. If the subject 90 is heavy, the subject 90 cannot be stably held when rotated by the rotation mechanism 11. To address this, the one (grasper 13a) of the pair of graspers 13, which grasp the subject 90, is fixed to the holder 15 at a position that is adjusted by the first fixed position adjuster 15a, and the another (grasper 13b) of the pair of graspers is fixed to the holder 15 at a position that is adjusted by the second fixed position adjuster 15b. In other words, each of the pair of graspers 13 is fixed to the holder 15 with the subject 90 being grasped by the graspers. Accordingly, for example, as compared with a case in which only one of the pair of graspers 13 is fixed to the holder 15, the subject 90 can be stably held even if the subject 90 is heavy. Consequently, it is possible to stably hold the subject 90 when capturing an image of the subject 90 while rotating the subject even if the subject is heavy.

In this embodiment, as discussed above, a subject holding mechanism 3 for an X-ray imaging apparatus 100 for irradiating a subject 90 with X-rays in an upward/downward direction (Z direction) to capture an image of the subject with the subject holding mechanism being detachably attached to the X-ray imaging apparatus to rotatably hold the subject 90, the subject holding mechanism 3 includes a subject grasping mechanism 10 including a pair of graspers 13 configured to grasp the subject 90, a pair of fasteners configured to fasten the pair of graspers 13, and a holder 15 configured to hold the pair of graspers 13, and a rotation mechanism 11 configured to rotate the subject grasping mechanism 10, which includes the pair of graspers 13 and the holder 15, about a rotation axis 81 extending in a direction intersecting an X-ray irradiation axis 80, the holder 15 includes a first fixed position adjuster 15a configured to adjust a fixed position of one of the pair of graspers 13 in a radial direction with respect to the rotation axis 81, and a second fixed position adjuster 15b configured to adjust a fixed position of another of the pair of graspers 13 in the radial direction with respect to the rotation axis, and the one of the pair of graspers 13 is fixed to the holder 15 at a position that is adjusted by the first fixed position adjuster 15a of the holder 15, and the another of the pair of graspers 13 is fixed to the holder 15 at a position that is adjusted by the second fixed position adjuster 15b of the holder 15.

According to this configuration, similar to the X-ray imaging apparatus 100, it is possible to provide a subject holding mechanism 3 capable of stably holding a subject 90 when an image of the subject is captured while the subject 90 is rotated even if the subject is heavy.

Figure 17:
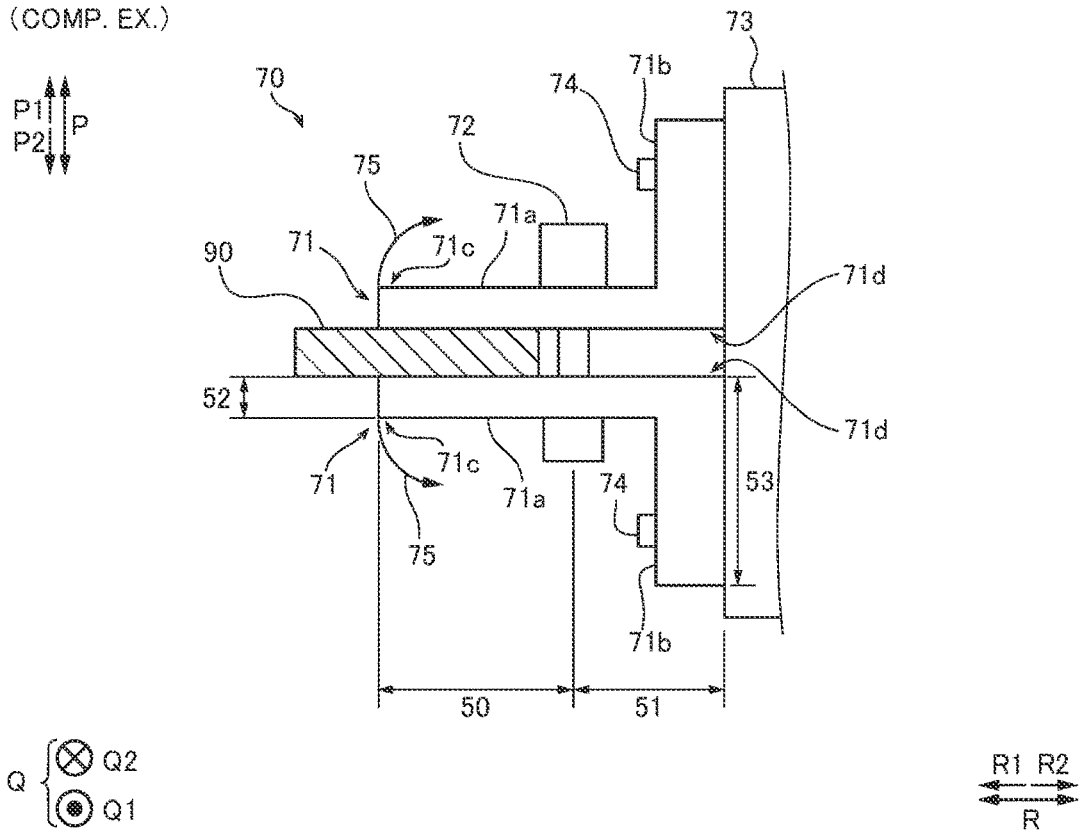
FIG. 17 is a schematic view showing a configuration of a subject grasping mechanism according to a comparative example.
Figure 18:
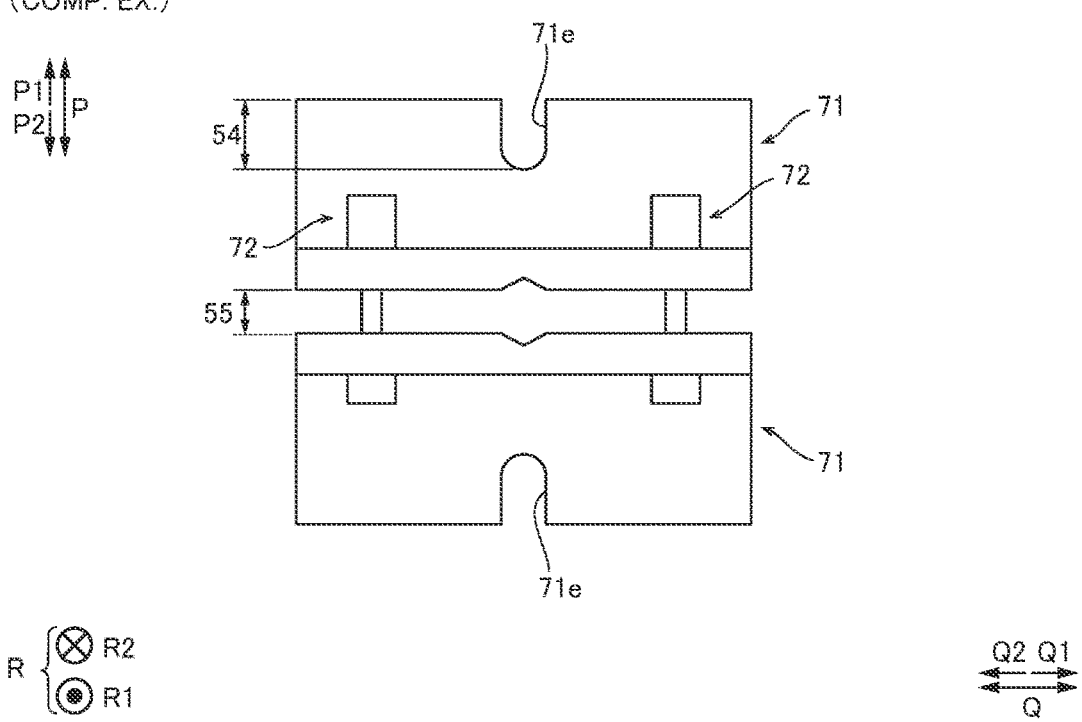
FIG. 18 is a schematic view showing a configuration of a grasper of the subject grasping mechanism according to the comparative example.

The following description will describe additional advantages of the X-ray imaging apparatus 100 and the subject holding mechanism 3 according to the foregoing embodiment in comparison between a configuration of a subject grasping mechanism 70 of a comparative example shown in FIGS. 17 and 18, and the configuration of the subject holding mechanism 3 according to the foregoing embodiment.

Comparative Example

As shown in FIG. 17, a subject grasping mechanism 70 includes a pair of graspers 71, a pair of first fasteners 72, a holder 73, and a pair of second fasteners 74. In order to easily visually distinguish between the pair of graspers 71 and the subject 90, the subject 90 is hatched for convenience in FIG. 17. In this specification, a direction in which the first fasteners 72 extend is defined as an S direction in the subject grasping mechanism 70 of the comparative example. One direction is defined as a P1 direction, and another direction is defined as a P2 direction in the P direction. Two directions orthogonal to each other in a plane orthogonal to the P-direction are defined as Q and R directions. One direction is defined as a Q1 direction, and another direction is defined as a Q2 direction in the Q direction. One direction is defined as a R1 direction, and another direction is defined as a R2 direction in the R direction.

The pair of graspers 71 have an L-shaped shape that rotates 90 degrees counterclockwise as viewed in the Q direction. The pair of graspers 71 are configured to hold the subject 90 by fastening the pair of first fasteners 72 with the subject 90 being grasped.

Specifically, the subject 90 is grasped by grasping parts 71a of the pair of graspers 71. In addition, each of the pair of graspers 71 includes a non-holding part 71b extending in the P direction. The non-holding part 71b has a through hole (not shown) into which the second fastener 74 is inserted so that the non-holding part 71b is fixed to the holder 73 by the second fastener 74.

As shown in FIG. 17, a length 50 from an edge 71c of the grasper 71 on one side in the R direction (R1 direction side) to the first fastener 72 is longer than a length 51 from the first fastener 72 to an edge 71d of the grasper 71 on another side (R2 direction side) in the R direction. A thickness 52 in the P direction of the edge 71c of the grasper 71 on the one side is different from a thickness 53 in the P direction of the edge 71d of the grasper 71 on the another side. In the exemplary configuration shown in FIG. 17, the thickness 53 is greater than the thickness 52. In other words, the grasper 71 of the comparative example has an asymmetrical shape as viewed in the Q direction (in a side view).

As shown in FIG. 17, in the grasper 71 of the comparative example, the length 50 from the edge 71c of the grasping part 71a to the first fastener 72 is longer than the length 51 from the first fastener 72 to the edge 71d of the grasping part 71a. For this reason, as shown in FIG. 17, in a case in which the subject 90 is grasped on the R1 direction side with respect to the pair of first fasteners 72, rotation moments can be produced on the end parts 71c of the pair of graspers 71 in directions in which the end parts 71c are moved apart from each other as indicated by arrows 75. If the rotation moments in the directions indicated by the arrows 75 are produced, the subject 90 cannot be stably held.

In addition, as shown in FIG. 18, each the graspers 71 has a groove 71e extending in the P direction and having a U-shape shape. The graspers 71 are fixed to the holder 73 (see FIG. 17) by fastening with the second fasteners 74 (see FIG. 17), which are inserted into the grooves 71e. In this case, the graspers 71 can be moved by a length 54 of the groove 71e in the P direction. Accordingly, positions of the graspers 71 can be adjusted in the P direction.

In the comparative example, the graspers 71 can be moved only by the length 54 of the groove 71e in the P direction, and as a result a movable distance of the pair of graspers 71 is small. In this case, because a distance 55 between the pair of graspers 71 cannot be large, the large subject 90 (see FIG. 11) that has the diameter 90a (see FIG. 11) cannot be grasped.

In the subject holding mechanism 3 included in the X-ray imaging apparatus 100 according to this embodiment, as shown in FIGS. 9 and 10, one (grasper 13a) of the pair of graspers 13 can be moved along first fixed position adjusters 15a in the S direction. In addition, another (grasper 13b) of the pair of graspers 13 can be moved along the second fixed position adjusters 15b in the S direction. Accordingly, the movable distances of the pair of graspers 13 in the S direction can be increased. For this reason, in the subject holding mechanism 3 included in the X-ray imaging apparatus 100 according to this embodiment, the distance 60 between the pair of graspers 13 can be large, even the large subject 90 that has the diameter 90a can be held. Consequently, it is possible to stably hold even the large subject 90 that is heavy and has the diameter 90a.

In addition, following additional advantages can be obtained by the aforementioned embodiment added with configurations discussed below.

That is, in this embodiment, as discussed above, the subject holding mechanism 3 further includes the pair of second fasteners 16 configured to fasten the pair of graspers 13 to the holder 15; the first fixed position adjuster 15a is a first elongated hole 15e that is formed to receive one (second fastener 16a) of the pair of second fasteners 16 and extends in the radial direction with respect to the rotation axis 81; and the second fixed position adjuster 15b is a second elongated hole 15f that is formed to receive another (second fastener 16b) of the pair of second fasteners 16 and extends in the radial direction with respect to the rotation axis 81. According to this configuration, a fixed position of the one (grasper 13a) of the pair of graspers 13 can be adjusted by the first elongated hole 15e, and as a result a movable distance of the fixed position of the one of the pair of graspers 13 can be increased when its fixed position is adjusted. Also, a fixed position of the another (grasper 13b) of the pair of graspers 13 can be adjusted by the second elongated hole 15f, and as a result a movable distance of the fixed position of the another of the pair of graspers 13 can be increased when its fixed position is adjusted. Consequently, the movable distances of the pair of graspers 13 can be large, and to easily grasp even the large subject 90 that has the diameter 90a. In addition, the pair of graspers 13 that grasp the subject 90 can be easily slid and moved together each other along the first elongated hole 15e and the second elongated hole 15f. Consequently, fixed positions of the pair of graspers 13 can be easily adjusted even if the pair of graspers 13 grasp the subject 90.

In this embodiment, as discussed above, a length 67 of the first elongated hole 15e extending in the radial direction with respect to the rotation axis 81 is different from a length 68 of the second elongated hole 15*f* extending in the radial direction with respect to the rotation axis 81. In a case in which the subject 90 is grasped by the pair of graspers 13, a distance 60 between the pair of graspers 13 is increased to a distance greater than the diameter 90*a* of the subject 90. In this case, only one of the pair of graspers 13 is required to slide and move, in other words, both of the pair of graspers 13 are not required to slide and move, For example, in a configuration in which the length 67 of the first elongated hole 15*e* extending in the radial direction with respect to the rotation axis 81 is equal to the length 68 of the second elongated hole 15*f* extending in the radial direction with respect to the rotation axis 81, and lengths of the elongated holes are large, the overall length (full length) of the holder 15 becomes large, and as a result the subject grasping mechanism 10 becomes large. To address this, as discussed above, one of the pair of graspers 13 is slid and moved along one elongated hole of the first elongated hole 15*e* and the second elongated hole 15*f* that has a longer length, and as a result the distance 60 between the pair of graspers 13 can be increased to a distance greater than the diameter 90*a* of the subject 90. As compared with the configuration in which the length 67 of the first elongated hole 15*e* is equal to the length 68 of the second elongated hole 15*f*, and the lengths of the elongated holes are large, one of the length 67 of the first elongated hole 15*e* extending in the radial direction with respect to the rotation axis 81 and the length 68 of the second elongated hole 15*f* extending in the radial direction with respect to the rotation axis 81 can be small. Accordingly, the overall length (total length) of the holder 15 in the radial direction with respect to the rotational axis 81 can be small. Consequently, it is possible to prevent that increase of the length of the holder 15 in the radial direction with respect to the rotational axis 81 increase a size of the subject grasping mechanism 10.

In this embodiment, as discussed above, each of the pair of graspers 13 includes an engagement part 22 that penetrates the grasper in a direction (U direction) extending parallel to the rotation axis 81, and is positioned between the pair of first fasteners 14 in a direction (T direction) in which the pair of first fasteners 14 are aligned with each other to engage one of the pair of second fasteners 16. According to this configuration, because the engagement part 22 is arranged between the pair of first fasteners 14, a radius in rotation of the pair of graspers 13 about the rotation axis 81 can be reduced as compared with a configuration in which the engagement part 22 is not arranged between the pair of first fasteners 14. Accordingly, the radius of rotation of the subject 90 about the rotation axis 81 can be reduced when the subject is rotated, and as a result it is possible to prevent increase of the subject holding mechanism 3.

In this embodiment, as discussed above, each of the pair of graspers 13 includes a grasping part 20 configured to grasp the subject 90; the grasping part 20 of each of the pair of graspers 13 has a concave shape; and the grasping part 20 of each of the pair of graspers 13 is arranged between the pair of first fasteners 14 in the direction (T direction) in which the pair of first fasteners 14 are aligned to grasp the subject 90. If the grasping part 20 is not arranged between the pair of first fasteners 14 in the T direction, the pair of first fasteners 14 will fasten the pair of graspers 13 at positions on one side of each grasper 13 in the T direction. In this case, a fastening force is applied only to one side of each of the pair of graspers 13 in the T direction. For this reason, rotation moments will be produced in end parts on another side of the pair of graspers 13 in the T direction to move the end parts of the pair of graspers 13 apart from each other. In this case, the subject 90 cannot be stably held. To address this, the grasping parts 20 of the pair of graspers 13 are arranged between the pair of first fasteners 14 to grasp the subject 90 so that fastening forces by the first fasteners 14 can be applied to both end parts in the T direction of each of the pair of graspers 13. As a result, it is possible to prevent that rotation moments are produced in end parts on one side of the pair of graspers 13 in the T direction to move the end parts apart from each other as compared with a configuration in which the subject 90 is grasped outside the pair of first fasteners 14 in the direction (T direction) in which the pair of first fasteners 14 are aligned with each other. Consequently, the subject 90 can be stably held.

In this embodiment, as discussed above, a plurality of types of graspers including grasping parts 20 having different shapes are provided to be used as the pair of graspers 13; and the subject grasping mechanism 10 including the pair of graspers 13 is detachably attached to the rotation mechanism 11. Accordingly, graspers including grasping parts 20 having different shapes can be changed from one pair to another pair depending on a size of a subject 90. As a result, it is possible to stably hold a number of types of subjects 90 having different sizes as compared with a configuration in which only one pair of graspers 13 are included. Also, because the subject grasping mechanism 10 is detachably attached to the rotation mechanism 11, the subject 90 can be grasped by the subject grasping mechanism 10 after the subject grasping mechanism is detached from the rotation mechanism 11. In other words, users can grasp the subject 90 by using the subject grasping mechanism 10 outside the X-ray imaging apparatus 100. As a result, users can easily grasp the subject 90 to the subject grasping mechanism 10 as compared with a configuration in which the subject grasping mechanism 10 is not detachable from the rotation mechanism 11.

In this embodiment, as discussed above, the holder 15, which is configured to hold the pair of graspers 13, is configured to be able to adjust a position of the subject 90 in the radial direction with respect to the rotation axis 81 of the rotation mechanism 11. Accordingly, a position of a rotation center of the subject 90 can be adjusted with respect to the rotation axis 81 of the rotation mechanism 11. As a result, because a rotation center of the subject 90 can agree with the rotation axis 81, a three-dimensional image can be reconstructed based on images of the subject, which are captured while the subject 90 is rotated about the rotation axis 81 without positioning the subject 90 for the rotation angles when the three-dimensional image is reconstructed. Consequently, it is possible to reduce a load of the reconstruction processing when the three-dimensional image is reconstructed.

In this embodiment, as discussed above, each of the pair of graspers 13 has a symmetric shape with respect to a line segment 82 that connects one end 14*c* to another end 14*d* of the first fastener 14 as viewed in the direction (T direction) in which the pair of first fasteners 14 are aligned with each other. For example, if each of the pair of graspers 13 has an asymmetric shape with respect to the line segment 82, the asymmetric shape of each of the pair of graspers 13 causes irregular rotational trajectories of the pair of graspers 13 when the graspers are rotated by the rotation mechanism 11. In this case, the subject 90 cannot be stably rotated by the rotation mechanism 11. To address this, in the aforementioned configuration, because each of the pair of graspers 13 has a symmetric shape with respect to the line segment 82, it is possible to prevent irregular rotational trajectories of the pair of graspers 13 when the graspers are rotated about the rotation axis 81 by the rotation mechanism 11 with the subject 90 being grasped by the pair of graspers 13. Consequently, it is possible to stably rotate the subject 90 when the pair of graspers 13 are rotated about the rotation axis 81 by the rotation mechanism 11 with the subject 90 being grasped by the pair of graspers 13.

In this embodiment, as discussed above, each of the pair of graspers 13 includes a pair of fixed parts 21 fixed by the pair of first fasteners 14; the pair of fixed parts 21 are arranged on both end parts of each of the pair of graspers 13 in the direction (T direction) in which the pair of first fasteners 14 are aligned with each other; and a thickness 65 in the radial direction with respect to the rotation axis 81 of one end side 121a of each of the pair of fixed parts 21 in a direction (U direction) extending parallel to the rotation axis 81 is equal to a thickness 66 in the radial direction with respect to the rotation axis 81 of another end side 121b of the fixed part. Accordingly, because the thickness 65 of the one end side 121a of each of the pair of fixed parts 21 is equal to the thickness 66 of the another end side 121b, a weight difference between the one end side 121a and the another end side 121b of the fixed part 21 can be reduced. Consequently, it is possible to stably rotate the subject when the pair of graspers 13 are rotated about the rotation axis 81 by the rotation mechanism 11 with the subject 90 being grasped by the pair of graspers 13.

In this embodiment, as discussed above, the subject holding mechanism 3 further includes a position-adjusting mechanism 12 arranged between the subject grasping mechanism 10 and the rotation mechanism 11 and configured to adjust a position of the subject grasping mechanism 10 in a plane intersecting the X-ray irradiation axis 80. For example, in a case in which an enlarged image of the subject 90 is captured, fine adjustment is required to adjust a position of a rotation center of the subject 90 with respect to the rotation axis 81 of the rotation mechanism 11. To address this, according to the aforementioned configuration, fine adjustment of the rotation center of the subject 90 with respect to the rotation axis 81 of the rotation mechanism 11 can be made by the position-adjusting mechanism 12. As a result, even in a case in which a user cannot easily manually adjust the position of the subject 90, such as in a case in which an enlarged image of the subject 90 is captured, the user can easily adjust the position of the subject.

In this embodiment, as discussed above, a subject placement mount 4 on which the subject 90 is placed is further provided; and the subject holding mechanism 3 is detachably attached to the subject placement mount 4. According to this configuration, the subject holding mechanism 3 can be mounted as an option to the subject placement mount 4 included in an existing X-ray imaging apparatus 100. As a result, because an X-ray imaging apparatus that cannot capture a three-dimensional image can capture a three-dimensional image when the subject holding mechanism 3 is mounted to the X-ray imaging apparatus, convenience (usability) for users can be improved.

In this embodiment, as discussed above, the subject placement mount 4 has a first opening 4b; the subject holding mechanism 3 further includes a base 17 that has a second opening 17b and is detachably attached into the first opening 4b; and the base 17 is configured to hold the rotation mechanism 11 and the subject grasping mechanism 10. Accordingly, the subject grasping mechanism 10 and the rotation mechanism 11 can be mounted to the X-ray imaging apparatus 100 by attaching the base 17 into the first opening 4b of the subject placement mount 4. Also, in a case in which a three-dimensional image of the subject 90 is not captured, the subject grasping mechanism 10 and the rotation mechanism 11 can be easily removed by detaching the base 17.

In this embodiment, as discussed above, the X-ray irradiator 1 is arranged on a lower side with respect to the X-ray detector 2: and the X-ray imaging apparatus further includes a subject-drop preventer 5 that is arranged between the X-ray irradiator 1 and the subject holding mechanism 3 to prevent the subject 90 from dropping, and has an area larger than an area of the second opening 17b in a plane view. Accordingly, the subject 90, which is held by the subject holding mechanism 3, can be prevented from dropping to the X-ray irradiator 1. Consequently, the subject 90, which is held by the subject holding mechanism 3, can be prevented from dropping to and from hitting the X-ray irradiator 1.

In this embodiment, as discussed above, the X-ray irradiator 1 is arranged on a lower side with respect to the X-ray detector 2: and the X-ray imaging apparatus further includes a contact preventer 6 arranged between the X-ray irradiator 1 and the subject holding mechanism 3 to cover the X-ray irradiator 1. Accordingly, the subject 90, which is held by the subject holding mechanism 3, can be prevented from contacting the X-ray irradiator 1 when images of the subject 90 are captured while rotating the subject.

Modified Embodiment

Note that the embodiment disclosed this time must be considered as illustrative in all points and not restrictive. The scope of the present invention is not shown by the above description of the embodiments but by the scope of claims for patent, and all modifications (modified examples) within the meaning and scope equivalent to the scope of claims for patent are further included.

While the example in which the first fixed position adjuster 15a is the first elongated hole 15e, and the second fixed position adjuster 15b is the second elongated hole 15f has been shown in the aforementioned embodiment, the present invention is not limited to this. For example, the first fixed position adjuster 15a and the second fixed position adjuster 15b may not be an elongated hole. The first fixed position adjuster 15a and the second fixed position adjuster 15b may have any structure as long as they can adjust a fixed position of the grasper 13. For example, each of the first fixed position adjuster 15a and the second fixed position adjuster 15b may include a plurality of screw holes which are aligned in the radial direction with respect to the rotation axis 81 and into which the second fastener 16 can be inserted. In a case in which each of the first fixed position adjuster 15a and the second fixed position adjuster 15b includes a plurality of screw holes which are aligned in the radial direction with respect to the rotation axis 81, fine adjustment of the fixed positions of the pair of graspers 13 will be difficult. For this reason, it is preferable that the first fixed position adjuster 15a and the second fixed position adjuster 15b are an elongated hole.

While the example in which the length 67 of the first elongated hole 15e and the length 68 of the second elongated hole 15f are different from each other has been shown in the aforementioned embodiment, the present invention is not limited to this. The length 67 of the first elongated hole 15e and the length 68 of the second elongated hole 15f may be equal to each other.

While the example in which the length 67 of the first elongated hole 15e is longer than the length 68 of the second elongated hole 15f has been shown in the aforementioned embodiment, the present invention is not limited to this. For example, the length 67 of the first elongated hole 15*e* may be shorter than the length 68 of the second elongated hole 15*f*.

While the example in which the engagement part 22 is arranged between the pair of first fasteners 14 in the direction (T direction) in which the pair of first fasteners 14 are aligned with each other has been shown in the aforementioned embodiment, the present invention is not limited to this. For example, the engagement part 22 may be arranged at a position other than the position between the pair of first fasteners 14 in the T direction. In a case in which the engagement part 22 is located at a position other than the position between the pair of first fasteners 14 in the T direction, alignment of a position of the center 90*b* of the subject 90 with the rotation axis 81 can be difficult. For this reason, the engagement part 22 is preferably arranged at a position between the pair of first fasteners 14.

While the example in which the grasping part 20 has a concave shape has been shown in the aforementioned embodiment, the present invention is not limited to this. The grasping part 20 may have a shape other than the concave shape as long as it can grasp the subject 90.

While the example in which the grasping part 20 of each of the pair of graspers 13 is arranged between the pair of first fasteners 14 in the direction (T direction) in which the pair of first fasteners 14 are aligned to grasp the subject 90 has been shown in the aforementioned embodiment, the present invention is not limited to this. For example, the grasping part 20 of each of the pair of graspers 13 may be arranged at a position other than the position between the pair of first fasteners 14 in the T direction. In a case in which the grasping part 20 of each of the pair of graspers 13 is arranged at a position other than the position between the pair of first fasteners 14 in the T direction, rotation moments can be produced on end parts on one side end (or another side end) of the pair of graspers in directions (T direction) in which the end parts are moved apart from each other, and as a result the subject 90 cannot be stably grasped. For this reason, the grasping part 20 of each of the pair of graspers 13 is preferably arranged at the position between the pair of first fasteners 14 in the T direction.

While the example in which a plurality of types of graspers 13 including grasping parts 20 having different shapes are provided to be used as the pair of graspers 13 has been shown in the aforementioned embodiment, the present invention is not limited to this. For example, only one type of graspers may be provided to be used as the pair of graspers 13. In a case in which only one type of graspers is provided to be used as the pair of graspers 13, various types of subjects 90 having various shapes may not be stably held. For this reason, a plurality of types of graspers including grasping parts 20 having different shapes are preferably provided to be used as the pair of graspers 13.

While the example in which the pair of graspers 13 includes two graspers 13 of the first grasper 130 and the second grasper 131 as a plurality of graspers 13 has been shown in the aforementioned embodiment, the present invention is not limited to this. For this reason, the pair of graspers 13 may include three or more graspers 13 including grasping parts 20 having different shapes.

While the example in which the holders 15 include the first holder 150 and the second holder 151 has been shown in the aforementioned embodiment, the present invention is not limited to this. For example, the holder 15 may include only one of the first holder 150 and the second holder 151. In a case in which the holder 15 includes only one of the first holder 150 and the second holder 151, the subject 90 having the diameter 90*a* cannot be grasped by the pair of graspers 13 depending on a size of the diameter. For this reason, it is preferable that the holders 15 include the first holder 150 and the second holder 151.

While the example in which the holders 15 include two types of holders of the first holder 150 and the second holder 151 has been shown in the aforementioned embodiment, the present invention is not limited to this. For example, the holders 15 may include three or more types of holders having different lengths of fixed position adjusters (elongated holes).

While the example in which the holder 15 is configured to be able to adjust a position of the subject 90 in the radial direction with respect to the rotation axis 81 of the rotation mechanism 11 has been shown in the aforementioned embodiment, the present invention is not limited to this. For example, the holder 15 may not be configured to be able to adjust a position of the subject 90 in the radial direction with respect to the rotation axis 81 of the rotation mechanism 11. In a case in which the holder 15 is not configured to be able to adjust a position of the subject 90 in the radial direction with respect to the rotation axis 81 of the rotation mechanism 11, alignment of a rotation center of the subject 90 with the rotation axis 81 can be difficult. In this case, because a rotation center of the subject 90 is necessarily brought in agreement with the rotation axis when a three-dimensional image is reconstructed based on images of the subject, which are captured while the subject 90 is rotated about the rotation axis 81, a load of the reconstruction processing of the three-dimensional image is large. For this reason, the holder 15 is preferably configured to be able to adjust a position of the subject 90 with respect to the rotation axis 81 of the rotation mechanism 11.

While the example in which each of the pair of graspers 13 has a symmetric shape with respect to a line segment 82 that connects one end 14*c* to another end 14*d* of the first fastener 14 as viewed in the direction (T direction) in which the pair of first fasteners 14 are aligned with each other has been shown in the aforementioned embodiment, the present invention is not limited to this. Each of the pair of graspers 13 may not have a symmetric shape with respect to the line segment 82. In a case in which Each of the pair of graspers 13 does not have a symmetric shape with respect to the line segment 82, moments can be produced in end parts on one side of the pair of graspers 13 in a directions (U directions) in which the rotation axis 81 extends to rotate the end parts apart from each other. In this case, the subject 90 cannot be stably grasped by the pair of graspers 13. For this reason, each of the pair of graspers 13 preferably has a symmetric shape with respect to a line segment 82 that connects one end 14*c* to another end 14*d* of the first fastener 14 as viewed in the direction in which the pair of first fasteners 14 are aligned with each other.

While the example in which a thickness 65 in the radial direction with respect to the rotation axis 81 of one end side 121*a* of each of the pair of fixed parts 21 in a direction (U direction) extending parallel to the rotation axis 81 is equal to a thickness 66 in the radial direction with respect to the rotation axis 81 of another end side 121*b* of the fixed part has been shown in the aforementioned embodiment, the present invention is not limited to this. For example, the thickness 65 in the radial direction with respect to the rotation axis 81 of the one end side 121*a* of each of the pair of fixed parts 21 may not be equal to the thickness 66 in the radial direction with respect to the rotation axis 81 of the another end side 121*b* of the fixed part. In a case in which the thickness 65 in the radial direction with respect to the rotation axis 81 of the one end side 121a of each of the pair of fixed parts 21 is not equal to the thickness 66 in the radial direction with respect to the rotation axis 81 of the another end side 121b of the fixed part, a weight differences between the one end side 121a and the another end side 121b can be large. In this case, when the pair of graspers 13 are rotated about the rotation axis 81 by the rotation mechanism 11 with the subject 90 being grasped by the pair of graspers 13, the weight difference of the fixed part 21 may cause unstable rotation. For this reason, it is preferable that the thickness 65 in the radial direction with respect to the rotation axis 81 of one end side 121a of each of the pair of fixed parts 21 in a direction (U direction) extending parallel to the rotation axis 81 is equal to the thickness 66 in the radial direction with respect to the rotation axis 81 of another end side 121b of the fixed part.

While the example in which the subject holding mechanism 3 includes the position-adjusting mechanism 12 has been shown in the aforementioned embodiment, the present invention is not limited to this. For example, the subject holding mechanism 3 may not include the position-adjusting mechanism 12. In a case in which the subject holding mechanism 3 does not include the position-adjusting mechanism 12, fine adjustment of a position of the subject 90 with respect to the rotation axis 81 of the rotation mechanism 11 is difficult. For this reason, the subject holding mechanism 3 preferably includes the position-adjusting mechanism 12.

While the example in which the subject holding mechanism 3 is detachably attached to the subject placement mount 4 has been shown in the aforementioned embodiment, the present invention is not limited to this. For example, the subject holding mechanism 3 may be detachably attached to a member other than the subject placement mount 4 as long as it is arranged between the X-ray irradiator 1 and the X-ray detector 2 and is detachably attached to the member.

While the example in which the X-ray imaging apparatus 100 includes the subject-drop preventer 5 has been shown in the aforementioned embodiment, the present invention is not limited to this. For example, the X-ray imaging apparatus 100 may not include the subject-drop preventer 5. In a case in which the X-ray imaging apparatus 100 does not include the subject-drop preventer 5, the subject 90 falling from the subject holding mechanism 3 may contact the X-ray irradiator 1. For this reason, the X-ray imaging apparatus 100 preferably includes the subject-drop preventer 5.

While the example in which the X-ray imaging apparatus 100 includes the contact preventer 6 has been shown in the aforementioned embodiment, the present invention is not limited to this. For example, the X-ray imaging apparatus 100 may not include the contact preventer 6. In a case in which the X-ray imaging apparatus 100 does not include the contact preventer 6, the subject 90, which is held by the subject holding mechanism 3, may contact the X-ray irradiator 1 when images of the subject 90 are captured while rotating the subject. For this reason, the X-ray imaging apparatus 100 preferably includes the contact preventer 6.

While the example in which the subject detection sensor 24 includes an optical sensor has been shown in the aforementioned embodiment, the present invention is not limited to this. For example, the subject detection sensor 24 may be an ultrasonic type detection sensor. The subject detection sensor 24 may be any type of detection sensor as long as it can detect that the subject 90 is arranged in proximity to the X-ray irradiator 1.

While the example in which one (grasper 13a) of the pair of graspers 13 is slid and moved when the pair of graspers 13 grasps the subject 90 has been shown in the aforementioned embodiment, the present invention is not limited to this. For example, another (grasper 13b) of the pair of graspers 13 may be slid and moved when the pair of graspers 13 grasps the subject 90.

Modes

The aforementioned exemplary embodiment will be understood as concrete examples of the following modes by those skilled in the art.

(Mode Item 1)

An X-ray imaging apparatus according to mode item 1 is an X-ray imaging apparatus for irradiating a subject with X-rays to capture an image of the subject, the X-ray imaging apparatus including an X-ray irradiator configured to irradiate the subject with the X-rays; an X-ray detector arranged to face the X-ray irradiator in an upward/downward direction and configured to detect the X-rays with which the subject is irradiated by the X-ray irradiator; and a subject holding mechanism arranged between the X-ray irradiator and the X-ray detector and configured to rotatably hold the subject, wherein the subject holding mechanism includes a subject grasping mechanism including a pair of graspers configured to grasp the subject, a pair of first fasteners configured to fasten the pair of graspers, and a holder configured to hold the pair of graspers, and a rotation mechanism configured to rotate the subject grasping mechanism, which includes the pair of graspers and the holder, about a rotation axis extending in a direction intersecting an X-ray irradiation axis, the holder includes a first fixed position adjuster configured to adjust a fixed position of one of the pair of graspers in a radial direction with respect to the rotation axis, and a second fixed position adjuster configured to adjust a fixed position of another of the pair of graspers in the radial direction with respect to the rotation axis, and the one of the pair of graspers is fixed to the holder at a position that is adjusted by the first fixed position adjuster of the holder, and the another of the pair of graspers is fixed to the holder at a position that is adjusted by the second fixed position adjuster of the holder.

(Mode Item 2)

In the X-ray imaging apparatus according to mode item 1, the subject holding mechanism further includes a pair of second fasteners configured to fasten the pair of graspers to the holder; the first fixed position adjuster is a first elongated hole that is formed to receive one of the pair of second fasteners and extends in the radial direction with respect to the rotation axis; and the second fixed position adjuster is a second elongated hole that is formed to receive another of the pair of second fasteners and extends in the radial direction with respect to the rotation axis.

(Mode Item 3)

In the X-ray imaging apparatus according to mode item 2, a length of the first elongated hole extending in the radial direction with respect to the rotation axis is different from a length of the second elongated hole extending in the radial direction with respect to the rotation axis.

(Mode Item 4)

In the X-ray imaging apparatus according to mode item 3, each of the pair of graspers includes an engagement part that penetrates the grasper in a direction extending parallel to the rotation axis, and is positioned between the pair of first fasteners in a direction in which the pair of first fasteners are aligned with each other to engage one of the pair of second fasteners.

(Mode Item 5)

In the X-ray imaging apparatus according to mode item 4, each of the pair of graspers includes a grasping part configured to grasp the subject; the grasping part of each of the pair of graspers has a concave shape; and the grasping part of each of the pair of graspers is arranged between the pair of first fasteners in the direction in which the pair of first fasteners are aligned to grasp the subject.

(Mode Item 6)

In the X-ray imaging apparatus according to mode item 5, a plurality of types of graspers including grasping parts having different shapes are provided to be used as the pair of graspers; and the subject grasping mechanism including the pair of graspers is detachably attached to the rotation mechanism.

(Mode Item 7)

In the X-ray imaging apparatus according to mode item 1, the holder, which is configured to hold the pair of graspers, is configured to be able to adjust a position of the subject in the radial direction with respect to the rotation axis of the rotation mechanism.

(Mode Item 8)

In the X-ray imaging apparatus according to mode item 1, each of the pair of graspers has a symmetric shape with respect to a line segment that connects one end to another end of the first fastener as viewed in a direction in which the pair of first fasteners are aligned with each other.

(Mode Item 9)

each of the pair of graspers includes a pair of fixed parts fixed by the pair of first fasteners;

In the X-ray imaging apparatus according to mode item 8, the pair of fixed parts are arranged on both end parts of each of the pair of graspers in the direction in which the pair of first fasteners are aligned with each other; and a thickness in the radial direction with respect to the rotation axis of one end part of each of the pair of fixed parts in a direction extending parallel to the rotation axis is equal to a thickness in the radial direction with respect to the rotation axis of another end part of the fixed part.

(Mode Item 10)

In the X-ray imaging apparatus according to mode item 1, the subject holding mechanism further includes a position-adjusting mechanism arranged between the subject grasping mechanism and the rotation mechanism and configured to adjust a position of the subject grasping mechanism in a plane intersecting the X-ray irradiation axis.

(Mode Item 11)

In the X-ray imaging apparatus according to mode item 1, a subject placement mount on which the subject is placed, wherein the subject holding mechanism is detachably attached to the subject placement mount.

(Mode Item 12)

In the X-ray imaging apparatus according to mode item 11, the subject placement mount has a first opening; the subject holding mechanism further includes a base that has a second opening and is detachably attached into the first opening; and the base is configured to hold the rotation mechanism and the subject grasping mechanism.

(Mode Item 13)

In the X-ray imaging apparatus according to mode item 12, the X-ray irradiator is arranged on a lower side with respect to the X-ray detector; and the X-ray imaging apparatus further comprises a subject-drop preventer that is arranged between the X-ray irradiator and the subject holding mechanism to prevent the subject from dropping, and has an area larger than an area of the second opening in a plane view.

(Mode Item 14)

In the X-ray imaging apparatus according to mode item 1, the X-ray irradiator is arranged on a lower side with respect to the X-ray detector; and the X-ray imaging apparatus further comprises a contact preventer arranged between the X-ray irradiator and the subject holding mechanism to cover the X-ray irradiator.

(Mode Item 15)

A subject holding mechanism according to mode item 15 is a subject holding mechanism for an X-ray imaging apparatus for irradiating a subject with X-rays in an upward/downward direction to capture an image of the subject with the subject holding mechanism being detachably attached to the X-ray imaging apparatus to rotatably hold the subject, the subject holding mechanism including a subject grasping mechanism including a pair of graspers configured to grasp the subject, a pair of fasteners configured to fasten the pair of graspers, and a holder configured to hold the pair of graspers, and a rotation mechanism configured to rotate the subject grasping mechanism, which includes the pair of graspers and the holder, about a rotation axis extending in a direction intersecting an X-ray irradiation axis, wherein the holder includes a first fixed position adjuster configured to adjust a fixed position of one of the pair of graspers in a radial direction with respect to the rotation axis, and a second fixed position adjuster configured to adjust a fixed position of another of the pair of graspers in the radial direction with respect to the rotation axis, and the one of the pair of graspers is fixed to the holder at a position that is adjusted by the first fixed position adjuster of the holder, and the another of the pair of graspers is fixed to the holder at a position that is adjusted by the second fixed position adjuster of the holder.

What is claimed is:

1. An X-ray imaging apparatus for irradiating a subject with X-rays to capture an image of the subject, the X-ray imaging apparatus comprising:
    an X-ray irradiator configured to irradiate the subject with the X-rays;
    an X-ray detector arranged to face the X-ray irradiator in an upward/downward direction and configured to detect the X-rays with which the subject is irradiated by the X-ray irradiator; and
    a subject holding mechanism arranged between the X-ray irradiator and the X-ray detector and configured to rotatably hold the subject, wherein
    the subject holding mechanism includes
    a subject grasping mechanism including a pair of graspers configured to grasp the subject, a pair of first fasteners configured to fasten the pair of graspers, and a holder configured to hold the pair of graspers, and
    a rotation mechanism configured to rotate the subject grasping mechanism, which includes the pair of graspers and the holder, about a rotation axis extending in a direction intersecting an X-ray irradiation axis,
    the holder includes a first fixed position adjuster configured to adjust a fixed position of one of the pair of graspers in a radial direction with respect to the rotation axis, and a second fixed position adjuster configured to adjust a fixed position of another of the pair of graspers in the radial direction with respect to the rotation axis, and
    the one of the pair of graspers is fixed to the holder at a position that is adjusted by the first fixed position adjuster of the holder, and the another of the pair of graspers is fixed to the holder at a position that is adjusted by the second fixed position adjuster of the holder.

2. The X-ray imaging apparatus according to claim 1, wherein the subject holding mechanism further includes a pair of second fasteners configured to fasten the pair of graspers to the holder;

the first fixed position adjuster is a first elongated hole that is formed to receive one of the pair of second fasteners and extends in the radial direction with respect to the rotation axis; and the second fixed position adjuster is a second elongated hole that is formed to receive another of the pair of second fasteners and extends in the radial direction with respect to the rotation axis.

3. The X-ray imaging apparatus according to claim 2, wherein a length of the first elongated hole extending in the radial direction with respect to the rotation axis is different from a length of the second elongated hole extending in the radial direction with respect to the rotation axis.

4. The X-ray imaging apparatus according to claim 3, wherein each of the pair of graspers includes an engagement part that penetrates the grasper in a direction extending parallel to the rotation axis, and is positioned between the pair of first fasteners in a direction in which the pair of first fasteners are aligned with each other to engage one of the pair of second fasteners.

5. The X-ray imaging apparatus according to claim 4, wherein
each of the pair of graspers includes a grasping part configured to grasp the subject;
the grasping part of each of the pair of graspers has a concave shape; and
the grasping part of each of the pair of graspers is arranged between the pair of first fasteners in the direction in which the pair of first fasteners are aligned to grasp the subject.

6. The X-ray imaging apparatus according to claim 5, wherein
a plurality of types of graspers including grasping parts having different shapes are provided to be used as the pair of graspers; and
the subject grasping mechanism including the pair of graspers is detachably attached to the rotation mechanism.

7. The X-ray imaging apparatus according to claim 1, wherein the holder, which is configured to hold the pair of graspers, is configured to be able to adjust a position of the subject in the radial direction with respect to the rotation axis of the rotation mechanism.

8. The X-ray imaging apparatus according to claim 1, wherein each of the pair of graspers has a symmetric shape with respect to a line segment that connects one end to another end of the first fastener as viewed in a direction in which the pair of first fasteners are aligned with each other.

9. The X-ray imaging apparatus according to claim 8, wherein
each of the pair of graspers includes a pair of fixed parts fixed by the pair of first fasteners;
the pair of fixed parts are arranged on both end parts of each of the pair of graspers in the direction in which the pair of first fasteners are aligned with each other; and
a thickness in the radial direction with respect to the rotation axis of one end part of each of the pair of fixed parts in a direction extending parallel to the rotation axis is equal to a thickness in the radial direction with respect to the rotation axis of another end part of the fixed part.

10. The X-ray imaging apparatus according to claim 1, wherein the subject holding mechanism further includes a position-adjusting mechanism arranged between the subject grasping mechanism and the rotation mechanism and configured to adjust a position of the subject grasping mechanism in a plane intersecting the X-ray irradiation axis.

11. The X-ray imaging apparatus according to claim 1 further comprising a subject placement mount on which the subject is placed, wherein
the subject holding mechanism is detachably attached to the subject placement mount.

12. The X-ray imaging apparatus according to claim 11, wherein
the subject placement mount has a first opening;
the subject holding mechanism further includes a base that has a second opening and is detachably attached into the first opening; and
the base is configured to hold the rotation mechanism and the subject grasping mechanism.

13. The X-ray imaging apparatus according to claim 12, wherein
the X-ray irradiator is arranged on a lower side with respect to the X-ray detector; and
the X-ray imaging apparatus further comprises a subject-drop preventer that is arranged between the X-ray irradiator and the subject holding mechanism to prevent the subject from dropping, and has an area larger than an area of the second opening in a plane view.

14. The X-ray imaging apparatus according to claim 1, wherein
the X-ray irradiator is arranged on a lower side with respect to the X-ray detector; and
the X-ray imaging apparatus further comprises a contact preventer arranged between the X-ray irradiator and the subject holding mechanism to cover the X-ray irradiator.

15. A subject holding mechanism for an X-ray imaging apparatus for irradiating a subject with X-rays in an upward/downward direction to capture an image of the subject with the subject holding mechanism being detachably attached to the X-ray imaging apparatus to rotatably hold the subject, the subject holding mechanism comprising:
a subject grasping mechanism including a pair of graspers configured to grasp the subject, a pair of fasteners configured to fasten the pair of graspers, and a holder configured to hold the pair of graspers, and
a rotation mechanism configured to rotate the subject grasping mechanism, which includes the pair of graspers and the holder, about a rotation axis extending in a direction intersecting an X-ray irradiation axis,
the holder includes a first fixed position adjuster configured to adjust a fixed position of one of the pair of graspers in a radial direction with respect to the rotation axis, and a second fixed position adjuster configured to adjust a fixed position of another of the pair of graspers in the radial direction with respect to the rotation axis, and
the one of the pair of graspers is fixed to the holder at a position that is adjusted by the first fixed position adjuster of the holder, and the another of the pair of graspers is fixed to the holder at a position that is adjusted by the second fixed position adjuster of the holder.

* * * * *